US012333788B2

(12) United States Patent
Portail et al.

(10) Patent No.: US 12,333,788 B2
(45) Date of Patent: *Jun. 17, 2025

(54) SYSTEM AND METHOD FOR SUBJECTIVE PROPERTY PARAMETER DETERMINATION

(71) Applicant: Cape Analytics, Inc., Palo Alto, CA (US)

(72) Inventors: Matthieu Portail, Mountain View, CA (US); Rostyslav Shevchenko, Palo Alto, CA (US)

(73) Assignee: Cape Analytics, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,157

(22) Filed: Feb. 15, 2024

(65) Prior Publication Data
US 2024/0185580 A1    Jun. 6, 2024

Related U.S. Application Data

(63) Continuation of application No. 18/100,736, filed on Jan. 24, 2023, now Pat. No. 11,935,276.

(60) Provisional application No. 63/302,287, filed on Jan. 24, 2022.

(51) Int. Cl.
*G06V 10/774* (2022.01)
*G06Q 50/16* (2012.01)
*G06T 7/00* (2017.01)

(52) U.S. Cl.
CPC .......... *G06V 10/774* (2022.01); *G06Q 50/16* (2013.01); *G06T 7/0002* (2013.01); *G06T 2207/20081* (2013.01)

(58) Field of Classification Search
CPC .... G06V 10/774; G06Q 50/16; G06T 7/0002; G06T 2207/20081
USPC ........................................................ 382/155
See application file for complete search history.

(56) References Cited

U.S. PATENT DOCUMENTS

| 5,633,946 A | 5/1997 | Lachinski et al. |
| 6,044,171 A | 3/2000 | Polyakov et al. |
| 6,249,616 B1 | 6/2001 | Hashimoto |
| 7,327,902 B2 | 2/2008 | Ritt et al. |

(Continued)

FOREIGN PATENT DOCUMENTS

| CN | 101549596 B | 8/2012 |
| CN | 105917335 A | 8/2016 |

(Continued)

OTHER PUBLICATIONS

Miao, Haotian, et al. "Multimodal aesthetic analysis assisted by styles through a multimodal co-transformer model." 2021 IEEE 24th International Conference on Computational Science and Engineering (CSE). IEEE, 2021. (Year: 2021).*

(Continued)

*Primary Examiner* — Jonathan S Lee
(74) *Attorney, Agent, or Firm* — Jeffrey Schox; Diana Lin

(57) ABSTRACT

In variants, the method for subjective property scoring can include determining an objective score for a subjective characteristic of a property using a model trained using subjective labels for a set of training properties. In examples, the model can be trained on subjective property rankings, determined using the subjective labels, for the set of training properties.

19 Claims, 12 Drawing Sheets

(56) References Cited

U.S. PATENT DOCUMENTS

| | | |
|---|---|---|
| 7,873,238 B2 | 1/2011 | Schultz et al. |
| 7,945,117 B2 | 5/2011 | Hermosillo et al. |
| 8,078,436 B2 | 12/2011 | Pershing et al. |
| 8,081,841 B2 | 12/2011 | Schultz et al. |
| 8,145,578 B2 | 3/2012 | Pershing et al. |
| 8,170,840 B2 | 5/2012 | Pershing |
| 8,207,964 B1 | 6/2012 | Meadow et al. |
| 8,209,152 B2 | 6/2012 | Pershing |
| 8,396,256 B2 | 3/2013 | Lu et al. |
| 8,401,222 B2 | 3/2013 | Thornberry et al. |
| 8,452,125 B2 | 5/2013 | Schultz et al. |
| 8,515,125 B2 | 8/2013 | Thornberry et al. |
| 8,531,472 B2 | 9/2013 | Freund et al. |
| 8,542,880 B2 | 9/2013 | Thornberry et al. |
| 8,548,248 B2 | 10/2013 | Mitchell et al. |
| 8,655,070 B1 | 2/2014 | Yang et al. |
| 8,660,382 B2 | 2/2014 | Schultz et al. |
| 8,670,961 B2 | 3/2014 | Pershing et al. |
| 8,731,234 B1 | 5/2014 | Ciarcia et al. |
| 8,760,285 B2 | 6/2014 | Billman et al. |
| 8,774,525 B2 | 7/2014 | Pershing |
| 8,818,770 B2 | 8/2014 | Pershing |
| 8,823,732 B2 | 9/2014 | Adams et al. |
| 8,825,454 B2 | 9/2014 | Pershing |
| 8,848,983 B1 | 9/2014 | Brewington et al. |
| 8,965,812 B2 | 2/2015 | Linville |
| 8,977,520 B2 | 3/2015 | Stephens et al. |
| 8,995,757 B1 | 3/2015 | Ciarcia et al. |
| 9,117,310 B2 | 8/2015 | Coene et al. |
| 9,129,376 B2 | 9/2015 | Pershing |
| 9,135,737 B2 | 9/2015 | Pershing |
| 9,141,880 B2 | 9/2015 | Ciarcia |
| 9,141,925 B2 | 9/2015 | Jung et al. |
| 9,147,287 B2 | 9/2015 | Ciarcia |
| 9,159,130 B2 | 10/2015 | Kneepkens |
| 9,159,164 B2 | 10/2015 | Ciarcia |
| 9,183,538 B2 | 11/2015 | Thornberry et al. |
| 9,244,589 B2 | 1/2016 | Thornberry et al. |
| 9,275,496 B2 | 3/2016 | Freund et al. |
| 9,292,913 B2 | 3/2016 | Schultz et al. |
| 9,329,749 B2 | 5/2016 | Thornberry et al. |
| 9,389,084 B1 | 7/2016 | Chen et al. |
| 9,437,029 B2 | 9/2016 | Schultz et al. |
| 9,514,568 B2 | 12/2016 | Pershing et al. |
| 9,520,000 B2 | 12/2016 | Freund et al. |
| 9,536,148 B2 | 1/2017 | Gross |
| 9,542,738 B2 | 1/2017 | Schultz et al. |
| 9,576,201 B2 | 2/2017 | Wu et al. |
| 9,599,466 B2 | 3/2017 | Pershing |
| 9,743,046 B2 | 8/2017 | Giuffrida et al. |
| 9,753,950 B2 | 9/2017 | Schultz et al. |
| 9,805,489 B2 | 10/2017 | Schultz et al. |
| 9,836,882 B2 | 12/2017 | Freund et al. |
| 9,911,042 B1 | 3/2018 | Cardona et al. |
| 9,911,228 B2 | 3/2018 | Pershing et al. |
| 9,922,412 B1 | 3/2018 | Freeman et al. |
| 9,933,254 B2 | 4/2018 | Thornberry et al. |
| 9,933,257 B2 | 4/2018 | Pershing |
| 9,959,581 B2 | 5/2018 | Pershing |
| 9,959,653 B2 | 5/2018 | Schultz et al. |
| 9,972,126 B2 | 5/2018 | Freund et al. |
| 10,002,415 B2 | 6/2018 | Shen et al. |
| 10,121,207 B1 | 11/2018 | Devereaux et al. |
| 10,169,680 B1 | 1/2019 | Sachdeva et al. |
| 10,197,391 B2 | 2/2019 | Thornberry et al. |
| 10,229,532 B2 | 3/2019 | Freund et al. |
| 10,311,302 B2 | 6/2019 | Kottenstette et al. |
| 10,338,222 B2 | 7/2019 | Schultz et al. |
| 10,346,935 B2 | 7/2019 | Thornberry et al. |
| 10,402,676 B2 | 9/2019 | Wang et al. |
| 10,430,902 B1 | 10/2019 | Rawat et al. |
| 10,453,147 B1 | 10/2019 | Davis |
| 10,455,197 B2 | 10/2019 | Giuffrida et al. |
| 10,467,476 B1 | 11/2019 | Cardona et al. |
| 10,489,953 B2 | 11/2019 | Schultz et al. |
| 10,503,843 B2 | 12/2019 | Keane |
| 10,515,414 B2 | 12/2019 | Pershing |
| 10,528,960 B2 | 1/2020 | Pershing et al. |
| 10,529,029 B2 | 1/2020 | Okazaki |
| 10,571,575 B2 | 2/2020 | Schultz et al. |
| 10,573,069 B2 | 2/2020 | Freund et al. |
| 10,648,800 B2 | 5/2020 | Thornberry et al. |
| 10,650,285 B1 | 5/2020 | Okazaki |
| 10,663,294 B2 | 5/2020 | Pershing et al. |
| 10,685,149 B2 | 6/2020 | Pershing |
| 10,796,189 B2 | 10/2020 | Wang et al. |
| 10,839,469 B2 | 11/2020 | Pershing |
| 10,937,178 B1 | 3/2021 | Srinivasan |
| 10,943,464 B1 | 3/2021 | Hayward et al. |
| 11,037,255 B1 | 6/2021 | Ganev et al. |
| 11,210,552 B2 | 12/2021 | Kossyk et al. |
| 11,367,265 B2 | 6/2022 | Vianello et al. |
| 11,430,069 B1 | 8/2022 | Pedersen et al. |
| 11,430,076 B1 | 8/2022 | Martin et al. |
| 11,488,255 B1 | 11/2022 | Mast et al. |
| 11,599,706 B1 | 3/2023 | Mark et al. |
| 11,631,235 B2 | 4/2023 | Vianello et al. |
| 11,651,552 B2 | 5/2023 | Valladolid et al. |
| 11,676,298 B1 | 6/2023 | Portail et al. |
| 11,816,747 B1 | 11/2023 | Buentello et al. |
| 2003/0146913 A1 | 8/2003 | Shen et al. |
| 2004/0153330 A1 | 8/2004 | Miller et al. |
| 2005/0084178 A1 | 4/2005 | Lure et al. |
| 2005/0154657 A1 | 7/2005 | Kim et al. |
| 2006/0165267 A1 | 7/2006 | Wyman et al. |
| 2008/0133319 A1 | 6/2008 | Adiga et al. |
| 2008/0255862 A1 | 10/2008 | Bailey et al. |
| 2010/0014781 A1 | 1/2010 | Liu et al. |
| 2010/0111428 A1 | 5/2010 | Yu et al. |
| 2010/0161498 A1 | 6/2010 | Walker et al. |
| 2010/0217566 A1 | 8/2010 | Wayne et al. |
| 2011/0251974 A1 | 10/2011 | Woodard et al. |
| 2012/0005109 A1 | 1/2012 | Stinson |
| 2012/0120069 A1 | 5/2012 | Kodaira et al. |
| 2012/0141014 A1 | 6/2012 | Lepikhin et al. |
| 2012/0265675 A1 | 10/2012 | Lawrence |
| 2013/0006676 A1 | 1/2013 | Helitzer et al. |
| 2013/0054476 A1 | 2/2013 | Whelan |
| 2013/0121571 A1 | 5/2013 | Gokturk et al. |
| 2013/0238512 A1 | 9/2013 | Treadwell et al. |
| 2014/0015924 A1 | 1/2014 | Pryor |
| 2014/0139515 A1 | 5/2014 | Kim et al. |
| 2014/0180989 A1 | 6/2014 | Krizhevsky et al. |
| 2015/0029176 A1 | 1/2015 | Baxter et al. |
| 2015/0088886 A1 | 3/2015 | Brouwer et al. |
| 2015/0131852 A1 | 5/2015 | Sweetser et al. |
| 2015/0186953 A1 | 7/2015 | Gross |
| 2015/0187015 A1 | 7/2015 | Adams et al. |
| 2015/0242747 A1 | 8/2015 | Packes et al. |
| 2015/0269598 A1 | 9/2015 | Terrazas et al. |
| 2015/0286786 A1 | 10/2015 | El-Baz et al. |
| 2015/0302529 A1 | 10/2015 | Jagannathan |
| 2015/0347872 A1 | 12/2015 | Taylor et al. |
| 2016/0026900 A1 | 1/2016 | Ando |
| 2016/0027051 A1 | 1/2016 | Gross |
| 2016/0048934 A1 | 2/2016 | Gross |
| 2016/0063516 A1 | 3/2016 | Terrazas et al. |
| 2016/0092959 A1 | 3/2016 | Gross |
| 2016/0162779 A1 | 6/2016 | Marcus et al. |
| 2016/0162986 A1 | 6/2016 | Ghosh |
| 2016/0292800 A1 | 10/2016 | Smith |
| 2016/0314545 A1 | 10/2016 | Jessen |
| 2017/0032481 A1 | 2/2017 | Dsouza et al. |
| 2017/0076365 A1 | 3/2017 | D'Souza |
| 2017/0270650 A1 | 9/2017 | Howe et al. |
| 2017/0352099 A1 | 12/2017 | Howe et al. |
| 2017/0357984 A1 | 12/2017 | Takamatsu et al. |
| 2018/0082388 A1 | 3/2018 | Takamatsu et al. |
| 2018/0096420 A1 | 4/2018 | Sun et al. |
| 2018/0101917 A1 | 4/2018 | Fujita |
| 2019/0057465 A1 | 2/2019 | Spath |
| 2019/0188516 A1 | 6/2019 | Porter et al. |
| 2019/0213412 A1 | 7/2019 | Kottenstette et al. |
| 2019/0213438 A1 | 7/2019 | Jones et al. |

(56) References Cited

U.S. PATENT DOCUMENTS

| | | |
|---|---|---|
| 2019/0294647 A1 | 9/2019 | Brouwer et al. |
| 2019/0304026 A1 | 10/2019 | Lyman et al. |
| 2019/0311044 A1 | 10/2019 | Xu et al. |
| 2019/0354772 A1 | 11/2019 | Tasli et al. |
| 2020/0034861 A1 | 1/2020 | Lundgren et al. |
| 2020/0082168 A1 | 3/2020 | Fathi et al. |
| 2020/0134733 A1 | 4/2020 | Maddox et al. |
| 2020/0134753 A1 | 4/2020 | Vickers |
| 2020/0151500 A1 | 5/2020 | Kossyk et al. |
| 2020/0160030 A1 | 5/2020 | Lavi |
| 2020/0226373 A1 | 7/2020 | Kottenstette et al. |
| 2020/0279653 A1 | 9/2020 | Hayward |
| 2020/0302644 A1 | 9/2020 | Sameer |
| 2020/0348132 A1 | 11/2020 | Du et al. |
| 2021/0065340 A1 | 3/2021 | El-Khamy et al. |
| 2021/0073930 A1 | 3/2021 | Khoshbin |
| 2021/0089811 A1 | 3/2021 | Strong |
| 2021/0110439 A1 | 4/2021 | Jayne et al. |
| 2021/0118165 A1 | 4/2021 | Strong |
| 2021/0124850 A1 | 4/2021 | Messervy et al. |
| 2021/0133936 A1 | 5/2021 | Chandra et al. |
| 2021/0142123 A1 | 5/2021 | Okazaki |
| 2021/0151195 A1 | 5/2021 | Hayward |
| 2021/0182529 A1 | 6/2021 | Singh et al. |
| 2021/0188312 A1 | 6/2021 | Shikari et al. |
| 2021/0199446 A1 | 7/2021 | Marschner et al. |
| 2021/0279824 A1 | 9/2021 | Choi et al. |
| 2021/0279852 A1 | 9/2021 | Jakka et al. |
| 2021/0312710 A1 | 10/2021 | Fathi et al. |
| 2021/0357642 A1 | 11/2021 | Stroud et al. |
| 2022/0012518 A1 | 1/2022 | Sutherland |
| 2022/0012918 A1 | 1/2022 | Kozikowski et al. |
| 2022/0036486 A1 | 2/2022 | Dhandapani et al. |
| 2022/0036537 A1 | 2/2022 | Johnson et al. |
| 2022/0099855 A1 | 3/2022 | Li et al. |
| 2022/0277358 A1 | 9/2022 | Shirai |
| 2022/0292650 A1 | 9/2022 | Amirghodsi et al. |
| 2022/0405856 A1 | 12/2022 | Hedges et al. |
| 2023/0011777 A1 | 1/2023 | Brown et al. |
| 2023/0023808 A1 | 1/2023 | Wall et al. |
| 2023/0119132 A1 | 4/2023 | Cebulski et al. |
| 2023/0143198 A1 | 5/2023 | Vianello |
| 2023/0153931 A1 | 5/2023 | Lee |
| 2023/0230220 A1 | 7/2023 | Portail et al. |
| 2023/0230250 A1 | 7/2023 | Vianello |
| 2023/0237775 A1 | 7/2023 | Portail |
| 2023/0385882 A1 | 11/2023 | Lee et al. |

FOREIGN PATENT DOCUMENTS

| | | |
|---|---|---|
| CN | 108197583 A | 6/2018 |
| CN | 108629287 A | 10/2018 |
| EP | 3340106 A1 | 6/2018 |
| EP | 4033426 A1 | 7/2022 |
| WO | 2012115594 A1 | 8/2012 |

OTHER PUBLICATIONS

Poursaeed, Omid, Tomáš Matera, and Serge Belongie. "Vision-based real estate price estimation." Machine Vision and Applications 29.4 (2018): 667-676. (Year: 2018).*

Uçan, Nazli Özge. Aesthetic quality assessment for real estate images through deep learning methods. MS thesis. Middle East Technical University, 2022. (Year: 2022).*

Bessinger, Zachary, and Nathan Jacobs. "Quantifying curb appeal." 2016 IEEE international conference on image processing (ICIP). IEEE, 2016. (Year: 2016).*

"Cape analytics now detects yard debris from Geospatial imagery", Dec. 18, 2019, pp. 1-4 (Year: 2019).

"Clip: Connecting Text and Images", https://openai.com/blog/clip/, Jan. 5, 2021.

"gdal_viewshed", © 1998-2022 Frank Warmerdam, Even Rouault, and others, downloaded Aug. 3, 2021, https://gdal.org/programs/gdal_viewshed.html.

"Geospatial Property Analytics: Supercharging AVMs for SFR Investing", Cape Analytics, downloaded Oct. 3, 2022, https://capeanalytics.com/blog/geospatial-property-analytics-avm-sfr-investing/.

"Hail Risk Assessment Hail Risk Score, Hail Damage Score", Verrisk Analytics, downloaded Oct. 15, 2021, https://www.verisk.com/insurance/products/hail-risk-assessment/.

"HOA Lookup City of Goodyear GIS", https://www.arcgis.com/apps/webappviewer/index.html?id=816ddfbd119e49d4a74bb30cb4592c22, first downloaded May 31, 2023.

"Industry-Leading Wildfire Risk Insights", zesty.ai, downloaded Oct. 15, 2021, https://www.zesty.ai/wildfire-risk.

"Manage wildfire risk at the address level", Verisk, downloaded Oct. 15, 2021, https://www.verisk.com/siteassets/media/downloads/underwriting/location/location-fireline.pdf?1 =.

"The Real Value of Change Detection: A ChangeFinderTM Story Map", https://www.eagleview.com/newsroom/2018/02/real-value-change-detection/, EagleView US, Feb. 28, 2018.

"Unique Building Identifier (UBID)", Office of Energy Efficiency & Renewable Energy, https://www.energy.gov/eere/buildings/unique-building-identifier-ubid#:~:text=UBID, first downloaded Dec. 22, 2022.

"ValPro+—Cape Analytics", Cape Analytics, https://web.archive.org/web/20210301122341/https://capeanalytics.com/valpro/, downloaded Oct. 3, 2022.

"Weiss Analytics Launches ValPro+, First AVM Powered by Cape Analytics' Instant Property Condition Assessments", Cape Analytics, Feb. 19, 2021, https://capeanalytics.com/resources/weiss-analytics-valpro-instant-property-condition-assessments/.

Ali, Imtiaz , "Unsupervised video analysis for counting of wood in river during floods", Springer-Verlag, 2009, pp. 578-587 (year: 2009).

Ambrosch, Philipp , et al., "System and Method for Property Group Analysis", U.S. Appl. No. 18/333,803, filed Jun. 13, 2023.

Arrowsmith, Ellie , et al., "Wildfire Fuel Management and Risk Mitigation", Insurance Institute for Business & Home Safety, zesty.ai, Apr. 2021.

Baranzini, Andrea , et al., "A Sight for Sore Eyes Assessing the value of view and landscape use on the housing market", Publisher:CRAG—Haute école de gestion de Genève, Genève, 2007.

Carlberg, Matthew , et al., "Classifying Urban Landscape in Aerial LIDAR Using 3D Shape Analysis", IEEE, 978-1-4244-5654-3, 2009, pp. 1701-1704 (Year: 2009).

Chen, Yixing , et al., "development of city—modeling", Energy and Buildings, 2019, pp. 252-265 (Year 2019).

Corbin, Matthew, et al., "System and Method for Property Data Management", U.S. Appl. No. 18/104,969, filed Feb. 2, 2023.

Dai, Xieer , et al., "Viewshed Effects and House Prices: Estimating A Spatial Hedonic Model", https://alrov.tau.ac.il/wp-content/uploads/2021/08/%D7%93%D7%A0%D7%99%D7%90%D7%9C-%D7%A4%D7%9C%D7%96%D7%A0%D7%A9%D7%98%D7%99%D7%99%D7%9F-2019.pdf, downloaded Aug. 3, 2021.

Eigen, David , et al., "Depth Map Prediction from a Single Image using a Multi-Scale Deep Network", Proceedings of Advances in Neural Information Processing Systems (NIPS), Jun. 2014.

Ermolin, S. V., et al., "Predicting Days-on-Market for Residential Real Estate Sales", (Year: 2016).

Friedland, Carol , et al., "Integrated Aerial-Based and ground Based-Scales", ResearchGate, Feb. 9, 2015, pp. 1-7 (Year: 2015).

Hamaguchi, Ryuhei , et al., "Rare Event Detection using Disentangled Representation Learning", arXiv:1812.01285, submitted Dec. 4, 2018, 2019 IEEE/CVF Conference on Computer Vision and Pattern Recognition (CVPR) Long Beach, CA, USA, Jun. 15-20, 2019.

Hedges, Ryan , et al., "System and Method for Environmental Evaluation", U.S. Appl. No. 18/509,640, filed Nov. 15, 2023.

(56) References Cited

OTHER PUBLICATIONS

Jiang, Shasha, et al., "Automatic urban debris zone extraction from post-hurricane very high-resolution satellite and aerial imagery", Geomatics, Natural hazards and Risk, 2016, pp. 933-952 (Year: 2016).

Johnson, et al., "Valuing curb appeal", The Journal of Real Estate Finance and Economics 60 (2020): 111-133. (Year: 2020).

Kalinicheva, Ekaterina, et al., "Unsupervised Change Detection Analysis in Satellite Image Time Series using Deep Learning Combined with Graph-Based Approaches", https://hal.archives-ouvertes.fr/hal-02749683, Jun. 3, 2020.

Kamara, Amadu Fullah, et al., "A hybrid neural network for predicting Days on Market a measure of liquidity in real estate industry", ScienceDirect, Knowledge-Based Systems, 208 (2020) 106417.

Kotova, Nadia, et al., "Liquidity in Residential Real Estate Markets", Apr. 2021, https://anthonyleezhang.github.io/pdfs/sfipd.pdf.

Lee, Jun-Tae, et al., "Image Aesthetic Assessment Based on Pairwise Comparison—A Unified Approach to Score Regression, Binary Classification, and Personalization", 2019 IEEE/CVF International Conference on Computer Vision (ICCV), Oct. 27, 2019-Nov. 2, 2019.

Lee, Xiang, et al., "System and Method for Property Analysis", U.S. Appl. No. 18/303,990, filed Apr. 20, 2023.

Liu, et al., "Learning multi-instance deep ranking and regression network for visual house appraisal", IEEE Transactions on Knowledge and Data Engineering 30.8 (2018): 1496-1506. (Year: 2018).

Maire, Frederic, et al., "A Convolutional Neural Network for Automatic Analysis of Aerial Imagery", 2014 International Conference on Digital Image Computing: Techniques and Applications (DICTA), 8 pages (2014).

Maloy, Mark A., et al., "An Accuracy Assessment of Various GIS-Based Viewshed Delineation Techniques", 2016.

Mansouri, Babak, "Earthquake building damage detection using VHR Satellite data", Case study; Two villages near Sarpol-e Zahab), JSEE, Jul. 29, 2018, pp. 45-55 (Year: 2018).

Moussa, A., et al., "Man-made objects classification from satellite/aerial imagery using neural networks", International Archives of the Photogrammetry, Remote Sensing and Spatial Information Sciences—ISPRS Archives, 4 pages (2010).

Muhs, Sebastian, "Automatic delineation—maps", Elsevier, 2016, p. 71-84 (Year: 2016).

Neptune, Nathalie, et al., "Automatic Annotation of Change Detection Images", Sensors, published Feb. 5, 2021.

Plank, Simon, "Rapid damage—Sentinel", Remote Sensing, May 28, 2014, pp. 4870-4906 (Year 2014).

Poursaeed, Omid, et al., "Vision-based Real Estate Price Estimation", arXiv:1707.05489 [cs.CV], https://doi.org/10.48550/arXiv.1707.05489, Machine Vision and Applications, 29(4), 667-676, 2018.

Radford, Alec, et al., "Learning Transferable Visual Models From Natural Language Supervision", arXiv:2103.00020v1 [cs.CV] Feb. 26, 2021.

Tran, Kieu, "Applying Segmentation and Neural Networks to Detect and Quantify Marine Debris From Aerial w Images Captured by an Unmanned Aerial System and Mobile Device", Aug. 2018, pp. 1-70 (Year 2018).

Tucker, Catherine, "Days on market and home sales", Days on market and home sales. The Rand Journal of Economics, 44(2), 337-360. (Year: 2013).

Urbis, Arvydas, et al., "GIS-Based Aesthetic Appraisal of Short-Range Viewsheds of Coastal Dune and Forest Landscapes", Forests 2021, 12, 1534. https://doi.org/10.3390/f12111534.

Van Leer, Kevin, "Responding to the Alarm Bell: Enabling a Better Understanding of Defensible Space and Wildfire Risk for Individual Structures", Cape Analytics, Apr. 11, 2019, https://capeanalytics.com/resources/responding-to-the-alarm-bell-enabling-a-better-understanding-of-defensible-space-and-wildfire-risk-for-individual-structures/.

Wang, Jianjun, et al., "Generating Viewsheds without Using Sightlines", Photogrammetric Engineering & Remote Sensing, vol. 66 No. 1, Jan. 2000, pp. 87-90.

Wang, Xuenting, et al., "Predicting the Attractiveness of Real-Estate Images by Pairwise Comparison using Deep Learning", 2019 IEEE International Conference on Multimedia & Expo Workshops (ICMEW), Shanghai, China, 2019, pp. 84-89, doi: 10.1109/ICMEW.2019.0-106.

Yu, Bailang, et al., "Automated derivation—method", Landscape and urban planning, 2020, pp. 210-219 (Year: 2010).

Zheng, Chuanxia, et al., "Pluralistic Image Completion", arXiv:1903.04227v2. Apr. 5, 2019.

Zhu, Hengshu, et al., "Days on Market: Measuring Liquidity in Real Estate Markets", KDD '16, Aug. 13-17, 2016, San Francisco, CA, USA.

\* cited by examiner

SYSTEM AND METHOD FOR SUBJECTIVE PROPERTY PARAMETER DETERMINATION

CROSS-REFERENCE TO RELATED APPLICATIONS

This application is a continuation of U.S. application Ser. No. 18/100,736 filed 24 Jan. 2023, which claims the benefit of U.S. Provisional Application No. 63/302,287 filed 24 Jan. 2022, each of which are incorporated in their entirety by this reference.

TECHNICAL FIELD

This invention relates generally to the property appearance field, and more specifically to a new and useful method and system for property appearance analysis.

DETAILED DESCRIPTION

The following description of embodiments of the invention is not intended to limit the invention to these embodiments, but rather to enable any person skilled in the art to make and use this invention.

1. OVERVIEW

Figure 1:
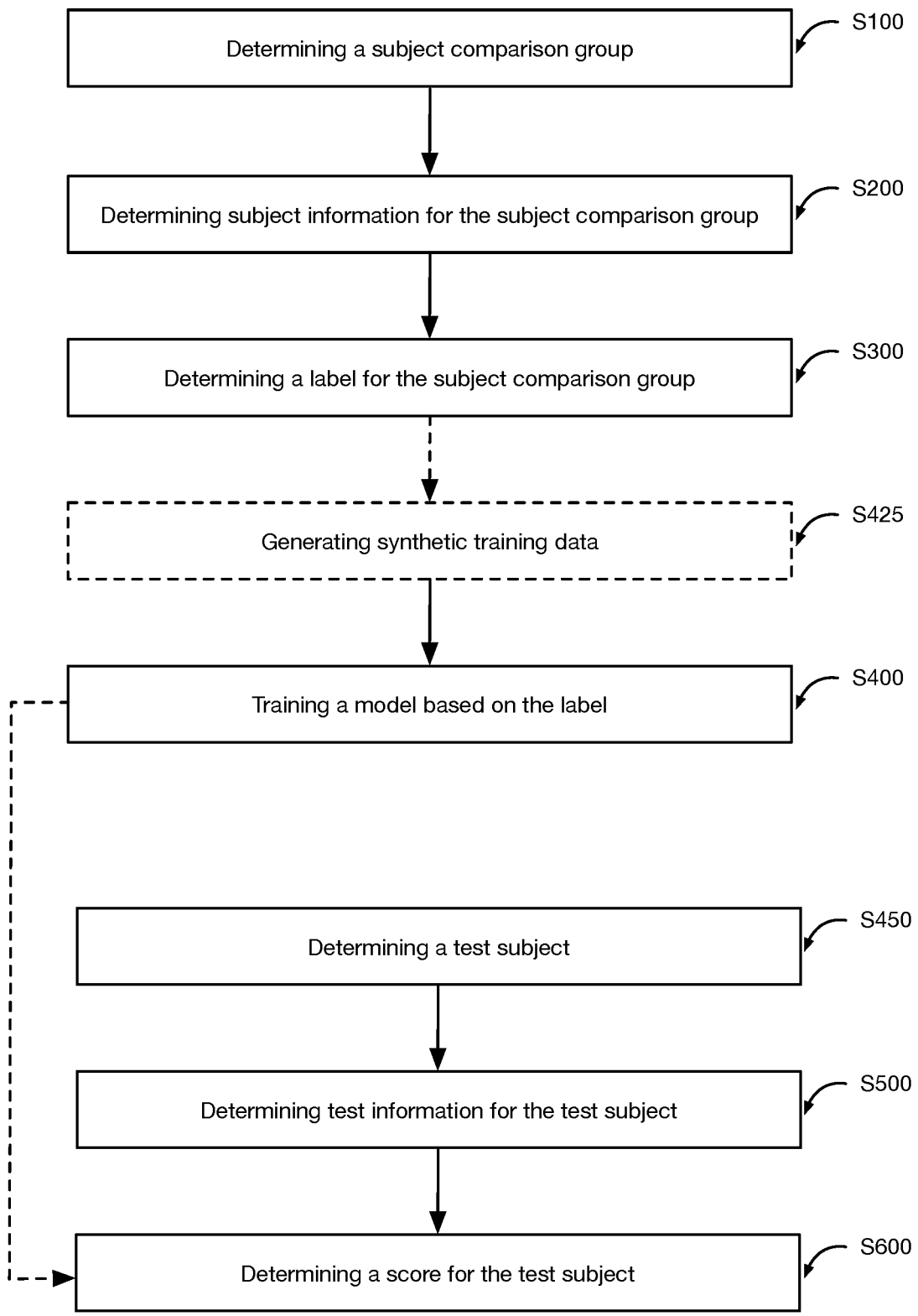
FIG. 1 is a flowchart representation of a variant of the method.

As shown in FIG. 1, the method for property appearance analysis can include: determining a subject comparison group S100, determining subject information for the subject comparison group S200, determining a label for the subject comparison group S300, and training a model based on the label S400. The method can additionally or alternatively include determining a test subject S450, determining test information for the test subject S500 and determining a score for the test subject S600. However, the method can additionally and/or alternatively include any other suitable elements.

The method functions to determine an objective score for a subjective characteristic of a subject. For example, the method can be used to score the curb appeal of a house, the attractiveness of a housing interior, the attractiveness of a landscape or yard, the appeal of a neighborhood, the condition of a roof, the health of a tree, and/or otherwise used. The objective score can be presented directly to a user (e.g., in an MLS™ application), be used as an input into a downstream model (e.g., an automated valuation model), and/or otherwise used.

2. TECHNICAL ADVANTAGES

Variants of the technology for property analysis can confer several benefits over conventional systems and benefits.

First, determining an objective score for a subjective characteristic (e.g., appeal, preferences, etc.) is incredibly difficult, particularly because humans inconsistently assign objective values to subjective characteristics. However, the inventors have discovered that humans can consistently evaluate subjective comparisons. For example, humans are inconsistent when rating the visual appeal of a house on a scale from 1-10, but are relatively consistent when ranking houses based on which house is more appealing than another. Variants of the technology leverage this finding by training a model to determine an objective score (e.g., rating) for each property that is indicative of whether the property would rank higher or lower than a peer. This provides a taxonomy-free, standardized, objective score that describes the subjective characteristic (e.g., level of attractiveness) of the subject. In another example, conventional roof condition determination methods cannot accurately predict a roofs true condition, since conventional methods rely on single-timepoint data, and the roof condition is a product of accumulated different forces acting upon the roof over time. While humans inconsistently assign roof condition labels to roofs, they are generally consistent when ranking the condition of one roof over another. Variants of the technology leverage this finding by using the relative roof condition rankings to train a model to determine an objective roof condition score (e.g., rating) for each property that is indicative of whether the roof would rank higher or lower than another property roof.

Second, variants of the technology can increase analysis accuracy by considering the objective score for the subjective characteristic. For example, the objective score can be used to improve the valuation accuracy output by automated valuation models when used as an input, since the automated valuation models often suffer from valuation error due to subjective characteristics that are not fully captured by the other objective inputs.

Figure 7:
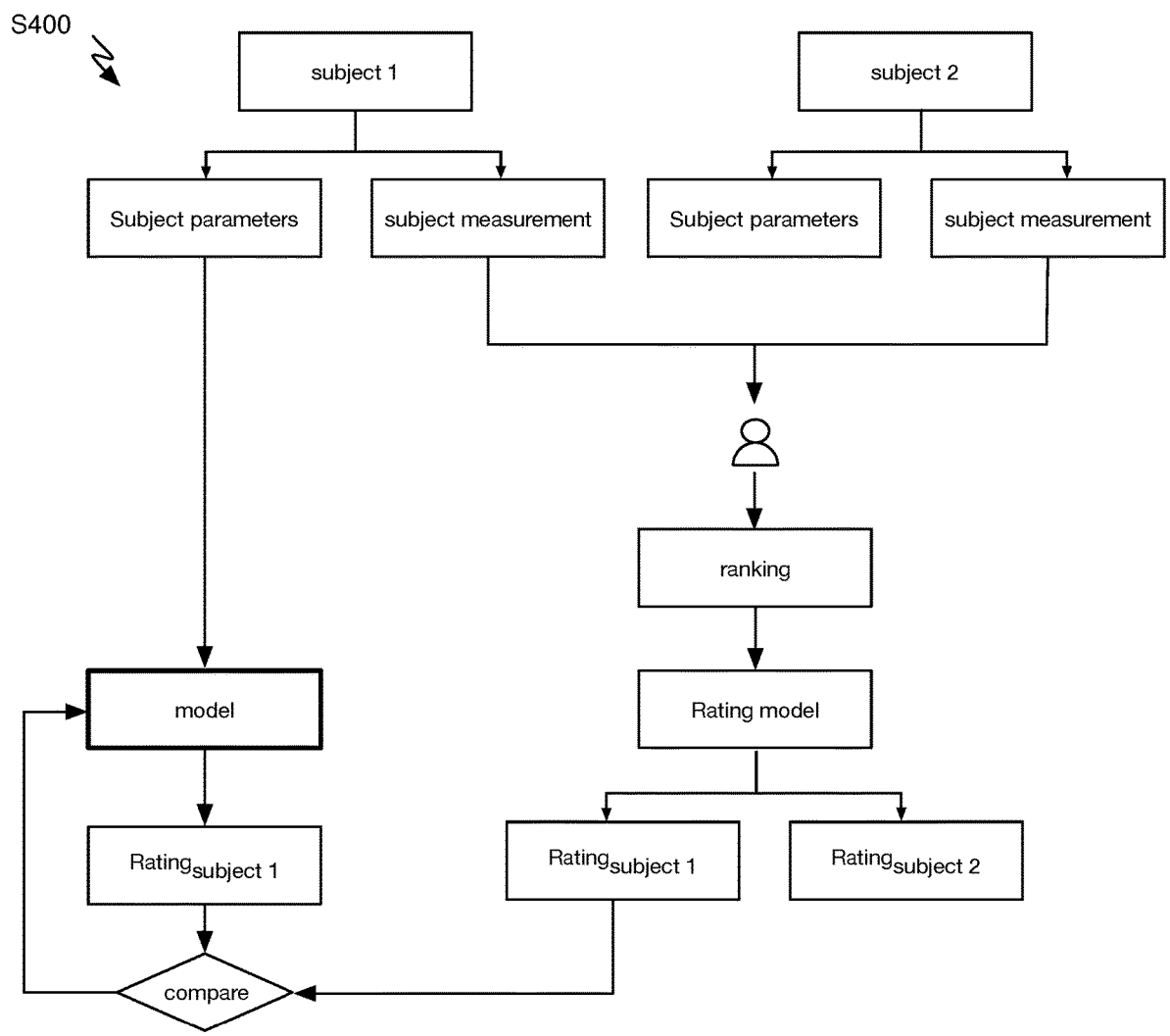
FIG. 7 is a schematic representation of an example of the method, wherein the model is trained to determine the score using a different input modality than that used to determine the label (e.g., ranking).
Figure 8:
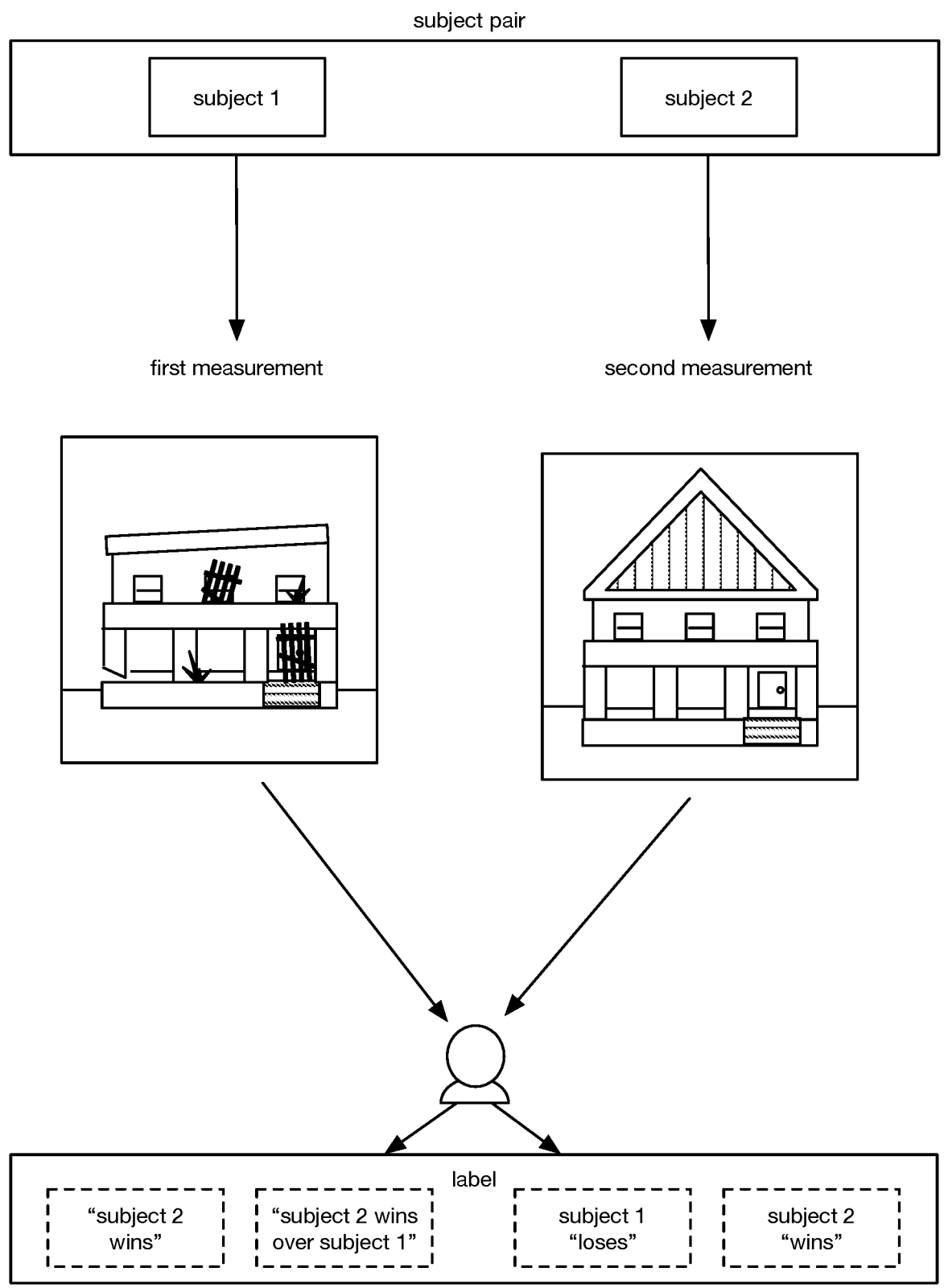
FIG. 8 is an illustrative example of determining a label for a subject pair.

Third, variants of the technology can enable the objective score to be determined from other property parameters (e.g., other description modalities) that are more difficult for humans to compare. For example, the relative ranking between different properties can be determined based on images or videos of the respective property (e.g., example shown in FIG. 8), but the model can be trained to determine the objective scores for each property based on the respective property descriptions, property attributes (e.g., beds, baths, year built, owner demographic, rental history, etc.), or other data (e.g., example shown in FIG. 7). This can increase the number of properties that can be objectively scored, beyond those that have already been imaged.

However, the technology can confer any other suitable benefits.

3. EXAMPLES

In illustrative examples, the method can include: determining a subject pair from a training subject set, wherein the subject pair includes different subjects; determining an image set for each subject of the subject pair, wherein the two image sets share the same image parameters (e.g., image quality, image size, scene class, perspective, etc.), manually determining a relative ranking (e.g., label) for the subject pair (e.g., which subject is preferred) based on a subjective comparison between the two image sets; optionally repeating the process for other subject pairs to determine an overall relative ranking for each training subject within the training subject set; and/or optionally determining a rating for each subject based on the respective relative ranking.

Figure 10A:
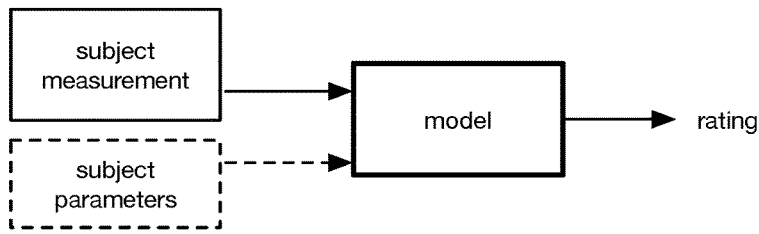
FIGS. 10A, 10B, 10C, and 10D are schematic representations of a first, second, third, and fourth example of determining a subject's score using the trained model, respectively.

In a first specific example, the score can be the subject's rating, wherein a model is trained to predict a subject's rating based on the respective subject information (e.g., image set) (e.g., illustrative example shown in FIG. 10A). In a first example, the model can be trained using the training subject's rating as a training target (e.g., illustrative example shown in FIG. 4). In a second example, the model can be trained by predicting a first and second training subject's rating or other score using the model, wherein the first and second training subject's rating then can be used to determine a predicted relative ranking between the first and second training subject (e.g., win/lose; preferred/unpreferred, etc.). The model is then trained on a comparison between the predicted relative ranking and the actual relative ranking between the first and second training subjects (e.g., illustrative example shown in FIG. 3).

Figure 6:
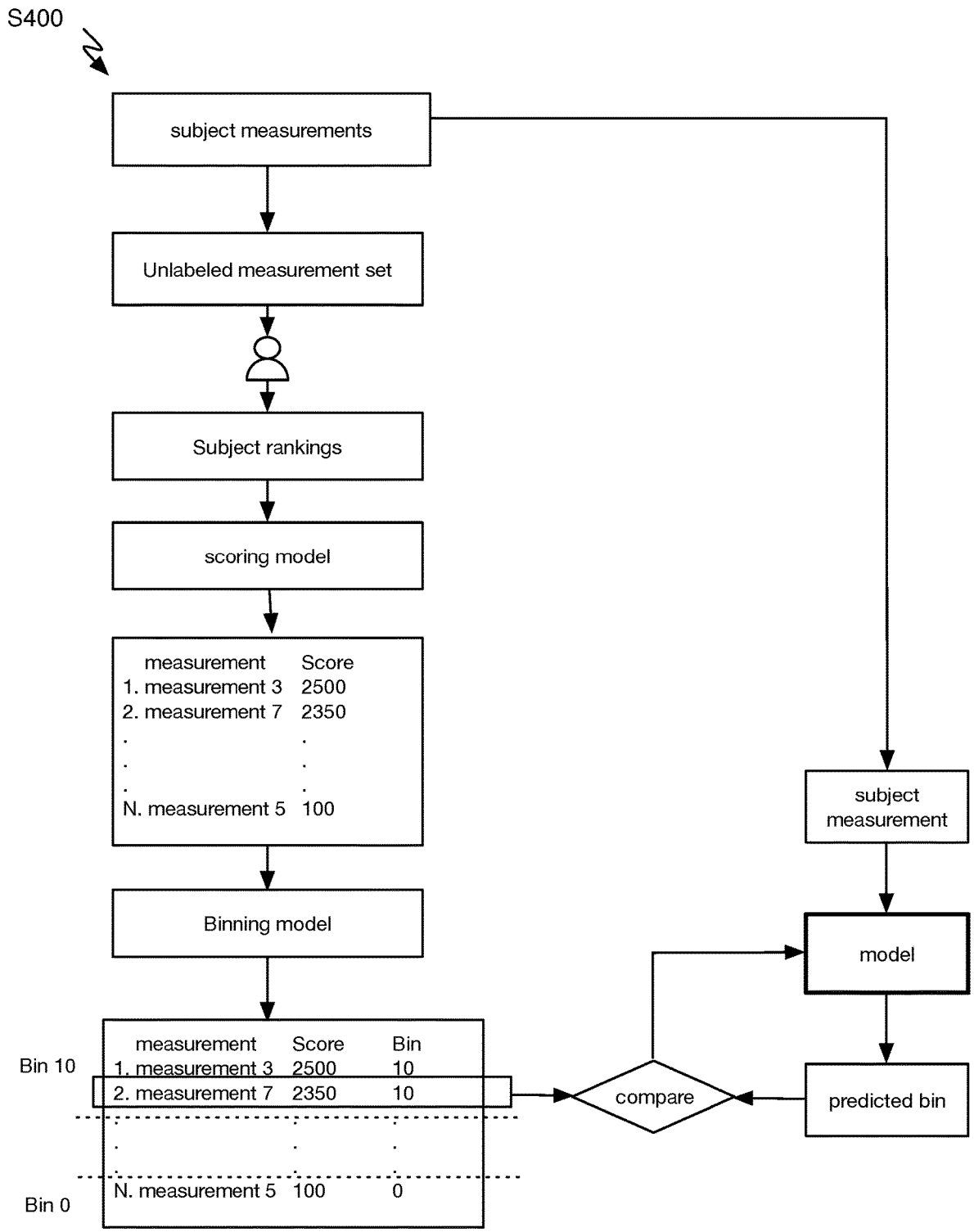
FIG. 6 is an illustrative example of a third variant of the method.
Figure 10B:
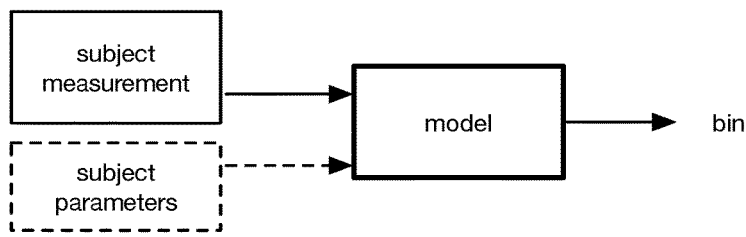
Figure 10C:
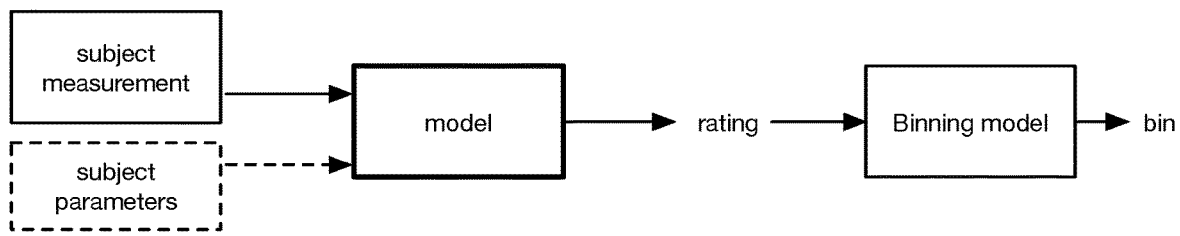

In a second specific example, the score can be a rating bin or cluster, wherein the training subjects' ratings are binned into bins (e.g., 1-10) or clusters (e.g., with descriptive labels), and the model is trained to predict the subject's bin based on the respective image set (e.g., illustrative examples shown in FIG. 6, FIG. 10B, and FIG. 10C). Additionally or alternatively, the model can be trained to predict the subject's rating (e.g., as in the first specific example), which is then binned into a predetermined bin or cluster.

Figure 10D:
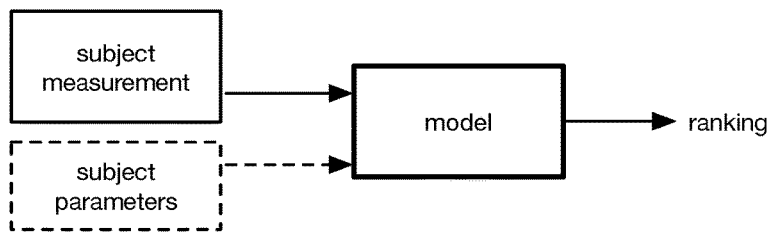

In a third specific example, the score can be the subject's ranking (e.g., within the training population), wherein a model is trained to determine a subject's rank (e.g., how a subject would be ranked relative to the training population). An illustrative example is shown in FIG. 10D.

The method can additionally or alternatively include: determining an image set for a subject identified in a request; and determining a score for the subject using the test image set and the trained model. In examples, the subjects can be properties (e.g., houses, parcels, etc.) that are up for sale, and the images can be obtained from a real estate listing service. However, the model can be otherwise trained, and/or the score can be otherwise determined.

4. METHOD

As shown in FIG. 1, the method for property appearance analysis can include: determining a subject comparison group S100, determining subject information for the subject comparison group S200, determining a label for the subject comparison group S300, and training a model based on the label S400. The method can additionally or alternatively include determining a test subject S450, determining test information for the test subject S500 and determining a score for the test subject S600. However, the method can additionally and/or alternatively include any other suitable elements.

The method functions to train a model configured to output an objective score for a subjective characteristic (e.g., attractiveness, sentiment, appeal, preference, condition, etc.) of a subject given a measurement of the subject. Additionally or alternatively, the method can be used to determine an objective score for a subjective characteristic of the subject.

The method can be performed for one subjective characteristic, multiple characteristics, and/or any other suitable number of characteristics. The subjective characteristic(s) can be attractiveness, sentiment, appeal, preference, and/or any other suitable subjective characteristic. Examples of subjective characteristics include: attractiveness of the exterior of a subject (e.g., curb appeal), attractiveness of the interior of a subject (e.g., kitchen inside a house), attractiveness of landscaping surround a subject, attractiveness of subjects within a radius of a subject, and/or any other suitable subjective characteristic.

All or portions of the method can be performed: in response to a request from an endpoint, before receipt of a request, and/or any other suitable time. The method can be performed for: all subjects within a subject set (e.g., all properties appearing in a measurement, etc.), a single subject (e.g., a requested property), and/or any other suitable set of subjects. One or more instances of the method can be repeated for different subjects, different subjective characteristics, timeframes, perspectives, and/or otherwise repeated.

The method can be performed using one or more: subjects, labels associated with subject sets (e.g., subject comparison groups), and objective scores, but can additionally or alternatively be performed using any other suitable set of entities and/or data objects.

The subjects function as the entities for which objective scores (representing subjective characteristics) are determined. Each subject can be associated with one or more subjective characteristics. The subjective characteristics are preferably characteristics that are difficult for humans to consistently rate, are based on personal feelings, tastes, or opinions, and/or are otherwise defined. The subjective characteristic(s) can be attractiveness, sentiment, appeal, preference, condition, and/or any other suitable subjective characteristic. Examples of subjective characteristics include: attractiveness of the exterior of a subject (e.g., curb appeal), viewshed appeal, attractiveness of the interior of a subject (e.g., kitchen inside a house), attractiveness of landscaping surround a subject, attractiveness of subjects within a radius of a subject, condition of a roof, and/or any other suitable subjective characteristic. The method can be used to determine one or more subjective characteristics of a subject.

The subject(s) can be a property, a product, and/or any other suitable subject. A property can be: real property (e.g., real estate, etc.), a point of interest, a geographic region (e.g., a neighborhood), a landmark, a built structure (e.g., a house, condominium, warehouse, deck, etc.), a component of a built structure (e.g., a roof, a side of a built structure, etc.), a parcel, a portion of a parcel (e.g., a yard, a backyard, etc.), a physical structure (e.g., a pool, a statue, a deck, etc.), vegetation (e.g., a tree, a garden, etc.), a scene, any other suitable object within a geographic region, and/or any other suitable subject. Types of properties may include residential properties (e.g., single-family home, multi-family home, apartment building, condominium, etc.), commercial properties (e.g., industrial center, forest land, farmland, quarry, retail, etc.), mixed-use properties, and/or any other suitable property class. The subject can be identified by a subject identifier (e.g., a property identifier, such as an address, a lot number, parcel number, etc.), by a geographic region identifier (e.g., latitude/longitude coordinates), not associated with an identifier, and/or otherwise identified.

Each subject can be associated with a set of subject information. The subject information can be static (e.g., remain constant over a threshold period of time) or variable (e.g., vary over time). The subject information can be associated with: a time (e.g., a generation time, a valid duration, etc.), a source (e.g., the information source), an accuracy or error, and/or any other suitable metadata. The subject information is preferably specific to the subject, but can additionally or alternatively be from other subjects (e.g., neighboring properties, other subjects sharing one or more attributes with the subject).

The subject information can include: measurements, measurement parameter values, descriptions, auxiliary data, subject attributes, and/or any other suitable information about the subject. The subject information can be sampled, retrieved from a third party (e.g., example shown in FIG. 2B), generated, and/or otherwise obtained.

The measurements function to measure an aspect about the subject. Each measurement preferably depicts or is associated with the respective subject, but can alternatively not depict or not be associated with the respective subject. The measurements are preferably appearance measurements, but can additionally or alternatively be geometric measurements, acoustic measurements, and/or other measurements. The measurements can include: remote measurements (e.g., aerial imagery, satellite imagery, balloon imagery, drone imagery, etc.), local or on-site measurements (e.g., sampled by a user, streetside measurements, etc.), and/or sampled at any other proximity to the property. The measurements can depict one or more subjects. The measurements can be: top-down measurements (e.g., nadir measurements, panoptic measurements, etc.), side measurements (e.g., elevation views, street measurements, etc.), angled and/or oblique measurements (e.g., at an angle to vertical, orthographic measurements, isometric views, etc.), and/or sampled from any other pose or angle relative to the property. The measurement can be an image (e.g., 2D image, MLS™ image, etc.), a video, an audio, a digital surface model, a virtual model, a viewshed representation, a point cloud, other imagery, and/or any other suitable measurement. Images can include oblique imagery (e.g., of a built structure, a street view image, etc.), aerial imagery, imagery of a subject's surroundings, exterior imagery (e.g., property interior), interior imagery, and/or any imagery. The measurements can depict the property exterior, the property interior, a property component, and/or any other view of the subject.

The measurements can be received as part of a user request, retrieved from a database, determined using other data (e.g., segmented from an image, generated from a set of images, etc.), synthetically determined, and/or otherwise determined.

Measurements can be associated with one or more measurement parameter values. Measurement parameter values can include: scene class (e.g., interior scene measurements, exterior scene measurements, etc.), perspective relative to the subject (e.g., front elevation, top planar view, front view, side view, etc.), pose relative to the subject, provider (e.g., vendor), format (e.g., JPEG, TIFF, PDF, RAW, etc.), modality (e.g., RBG camera, point cloud, etc.), season, measurement time, measurement quality (e.g., pixel density, graniness, noise, resolution, zoom, etc.), measurement date, time of day, measurement location (e.g., latitude/longitude coordinates, position relative to subject, etc.), and/or any other suitable contextual parameters. In variants, when measurements of different subjects are used to determine the labels (e.g., presented to a rater for rating), the measurements preferably share at least one or more measurement parameter values (e.g., same quality, same resolution, same perspective, etc.); alternatively, the measurements can have different measurement parameter values. The measurements used during training and runtime preferably share measurement parameter values, but can alternatively have different measurement parameter values.

The subject information can include subject descriptions. The subject description can be: a written description (e.g., a text description), an audio description, and/or in any other suitable format. The subject description is preferably verbal but can alternatively be nonverbal. Examples of subject descriptions can include: listing descriptions (e.g., from a realtor, listing agent, etc.), property disclosures, inspection reports, permit data, appraisal reports, and/or any other text based description of a subject.

The subject information can include auxiliary data. Examples of auxiliary data can include property descriptions, permit data, insurance loss data, inspection data, appraisal data, broker price opinion data, property valuations, property attribute and/or component data (e.g., values), and/or any other suitable data. The subject information can include subject attributes (e.g., subject parameter values), which function to represent one or more aspects of a given subject. The subject attributes can be semantic, quantitative, qualitative, and/or otherwise describe the subject. Each subject can be associated with its own set of subject attributes, and/or share subject attributes with other subjects. As used herein, subject attributes can refer to the attribute parameter (e.g., the variable) and/or the attribute value (e.g., value bound to the variable for the subject).

Subject attributes can include: subject class (e.g., house, physical structure, vegetation, property segment, etc.), subject subclass (e.g., single-family house, multi-family house, apartment, condominium, commercial, mixed-use, etc.), location (e.g., neighborhood, ZIP code, etc.), location type (e.g., suburban neighborhood, urban neighborhood, rural, etc.), viewshed (e.g., lake view, mountain view, terrestrial view, adversarial view, etc.), built feature values (e.g., roof slope, roof rating, roof material, etc.), record attributes (e.g., number of bed and baths, construction year, square footage, parcel area, etc.), condition attributes, semantic attributes (e.g., "turn key", "move-in ready", "poor condition", "walkable", "popular", "small", any other text-based descriptors, etc.), property values (e.g., subject property value, neighboring property value, etc.), risk asset scores (e.g., asset score indicating risk of flooding, hail, wildfire, wind, house fire, etc.), vegetation parameters (e.g., coverage, density, setback, location within one or more zones relative to the property), and/or any other suitable set of attributes.

Subject attributes can be determined from and/or include subject measurements, permit data, insurance loss data, inspection data, appraisal data, broker price opinion data, property valuations, property attribute and/or component data (e.g., values), and/or other information. Subject attributes can be determined from government records, extracted from property measurements, and/or otherwise determined. Subject attributes can be determined based on subject information for the subject itself, other subjects (e.g., neighboring properties), and/or any other set of subjects. Subject attributes can be automatically determined, manually determined, and/or otherwise determined. The subject attributes can be extracted using a model (e.g., an NLP model, a CNN, a DNN, etc.) trained to identify keywords, trained to classify or detect whether a subject attribute appears within the property information, and/or otherwise trained.

In variants subject attributes can be determined using one or more of the methods disclosed in: U.S. Pat. No. 10,311,302 issued Jun. 4, 2019, U.S. Pat. No. 11,222,426 issued Jan. 11, 2022, U.S. Pat. No. 11,367,265 issued Jun. 21, 2022, U.S. application Ser. No. 17/870,279 filed 21 Jul. 2022, U.S. application Ser. No. 17/858,422 filed 6 Jul. 2022, U.S. application Ser. No. 17/981,903 filed 7 Nov. 2022, U.S. application Ser. No. 17/968,662 filed 18 Oct. 2022, U.S. application Ser. No. 17/841,981 filed 6 Jun. 2022, and U.S. application Ser. No. 18/074,295 filed 2 Dec. 2022, all of which are incorporated herein in their entireties by this reference. However, the subject attributes can be otherwise determined.

However, the subject information can include any other suitable information about the subject, and/or be otherwise determined.

Subjects can be grouped into one or more subject comparison groups. Subject comparison groups function as the entities for which a subjective comparison between multiple subjects can be determined (e.g., labels are determined for the entire comparison group and/or between members of the comparison group). Each subject comparison group preferably includes two subjects (e.g., a subject comparison pair), but can additionally and/or alternatively include three or more subjects, or include a single subject. Each subject comparison group can include a unique set of subjects, or alternatively multiple subject comparison groups can include one or more subjects in common (e.g., the comparison groups can be overlapping or disjoint). Each subject comparison group preferably contains the same number of subjects, but alternatively the sizes of subject comparison groups can vary across groups. Each subject comparison group preferably includes different subjects (e.g., house A and house B), but can additionally and/or alternatively include the same subject (e.g., house A and house A from different perspectives, house A and house A at different points in time, house A and house A with a remodel, etc.). The subjects within each subject comparison group can have the same subject attribute values and/or different subject attribute values.

Subjects can optionally be determined from a subject set (e.g., a training subject set, a test subject set, etc.). Subject sets function as a group of subjects from which subjects can be determined for the purposes of the method (e.g., a set of available subjects to split into test and training subsets, a subject set from which comparison groups can be determined, a target subject set for analysis, etc.). A subject set can include one or more subjects. The subject set can be determined for any step of the method (e.g., for determining subject comparison groups, for determining labels, as input for training the model, as a target test subject, etc.). The subject set can be limited by one or more subject attributes (e.g., only include single family homes, only include subjects from a single neighborhood), or can be unlimited.

The labels are preferably subjective characterizations of the subjects, but can alternatively be objective characterizations of the subjects. The labels are preferably indicative of relative rankings of different subjects, but can alternatively be used to infer the relative rankings (e.g., sentiment analysis is used to determine which property a labeler prefers based on the descriptions provided by the labeler). Each subjective characteristic can be associated with one or more labels. A label preferably indicates a winner for a subject comparison group based on a subjective attribute (e.g., curb appeal). Alternatively, a label can indicate a loser, a tie, an order of preference within a subject comparison group, and/or other information comparing the subjects within a subject comparison group. Each label is preferably binary (e.g., wins and loses, 0 and 1, etc.), but can alternatively be non-binary (e.g., multi-subject ranking). Each label can be a numerical label (e.g., 0, 1, 2, etc.), a categorical label (e.g., wins, loses, ties, more appealing, less appealing, better, much better, etc.), and/or any other suitable label type. Each label is preferably associated with a comparison between a set of subjects (e.g., subjects within a subject comparison group). However, the labels can be associated with individual subjects. The label preferably represents the relative ranking of the subjects within the set (e.g., which subject is preferred, which subject's subjective characteristic is higher or lower than the remainder of the subjects, etc.); however, the label can represent a rating (e.g., score), a classification, and/or any other suitable information. The label can be determined: by a user; by inferring the label based on descriptions or other subject information; and/or otherwise determined. The user can determine the label based on subject measurements (e.g., images and/or video presented to the user on a user interface; example shown in FIG. 2B), by visiting the subjects (e.g., physically visiting the property and labeling the subjects based on the onsite visit), and/or otherwise determine the label.

The objective score functions to provide an objective measure of a subjective characteristic. Each subjective characteristic is preferably associated with its own set of objective scores; alternatively, objective scores can be shared between subjective characteristics. The objective scores can be absolute (e.g., wherein one subject measurement maps to one objective score), or alternatively relative (e.g., regionally dependent, relevant to a subject attribute value, a measure of how the subject rates relative to the training property set, etc.). The objective score can be a numerical score (e.g., 100, 500, 2500, etc.), a classification (e.g., "appealing", "not appealing"), a categorical variable (e.g., a whole number contained within a range; a label such as "high appeal", "moderate appeal, "low appeal", etc.; etc.), and/or other objective metrics. The objective score can be continuous, discrete, and/or otherwise characterized. The objective score is preferably quantitative, but can alternatively be qualitative. The objective scores for the subjects are preferably determined on the same scale (e.g., such that the objective scores for two subjects can be compared against each other), but can alternatively be determined on different scales. The objective scores can be normalized to a predetermined scale (e.g., converted to a scale of 1-10), binned into predetermined classifications, provided as raw scores, and/or otherwise modified or unmodified. In an example, the objective score can be a categorical variable value that reflects a relative position of a subject and/or subject measurement within a rank-based distribution of the set of ranked subjects and/or subject measurements.

The objective score can be: a rating (e.g., determined from the labels or rankings), a score indicative of a ranking, a bin (e.g., wherein each bin encompasses a set of rating values), a cluster (e.g., encompassing a set of rating values, encompassing a permutation of values for different subjective characteristic ratings, etc.), a ranking, and/or be any other suitable score. For example, the objective score can be a rating (e.g., Elo rating, Gliko rating, Harkness rating, etc.) indicative of how the subject ranks (e.g., subjectively ranks) against all other considered subjects.

The objective score can be determined by the scoring model, by a rating model (e.g., rating algorithm, such as the Elo rating algorithm, Glicko rating algorithm, etc.), by a binning or clustering model, and/or by any other suitable system. The objective score can be predicted, inferred, calculated, and/or otherwise determined.

However, the method can be performed using any other suitable set of entities and/or data objects.

Figure 2A:
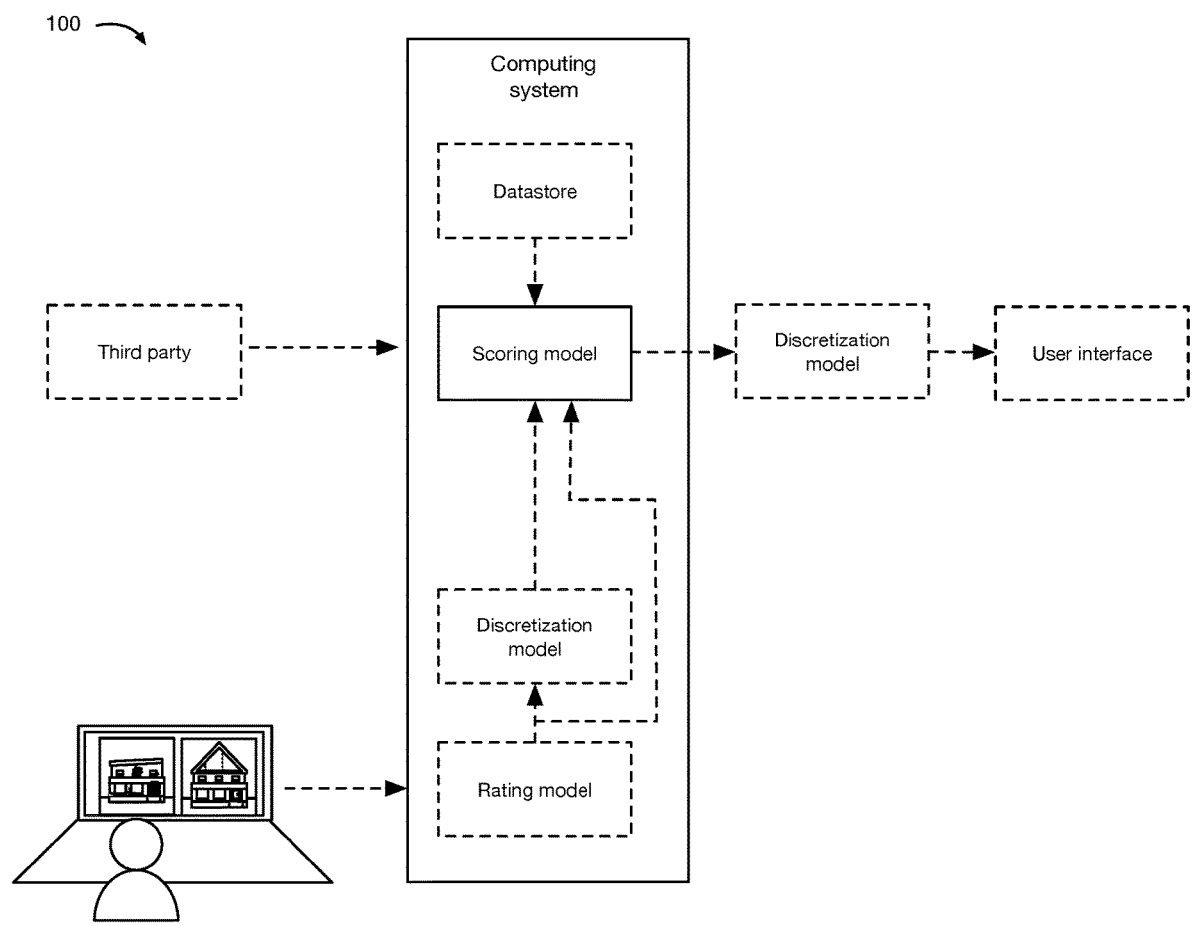
FIGS. 2A and 2B are schematic representations of variants of the system.
Figure 2B:
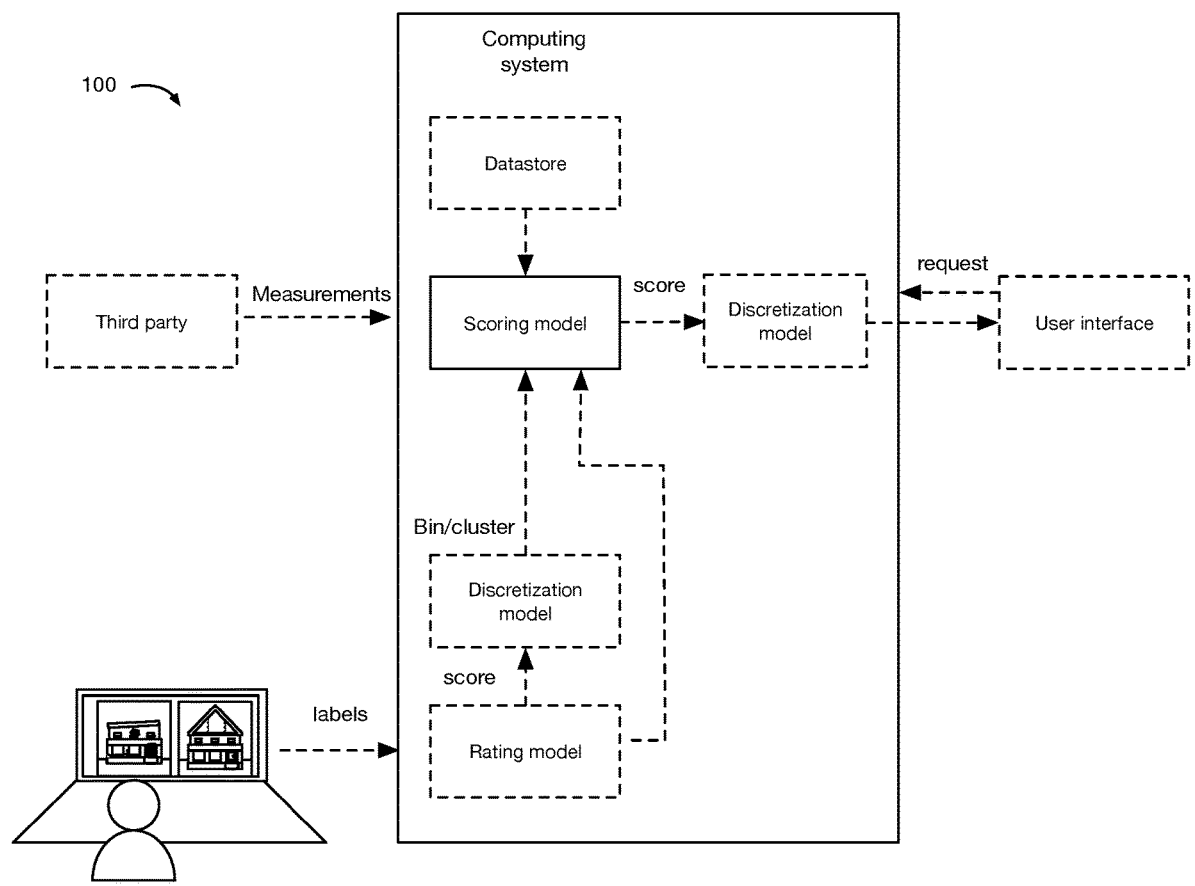

As shown in FIG. 2A, variants of the method can be performed using a system 100 including one or more: scoring models, rating models, discretization models, and/or other models. The models function to transform information from one modality into a different modality, and/or perform other functions.

The models can be or include: neural networks (e.g., CNN, DNN, etc.), an equation (e.g., weighted equations), regression (e.g., leverage regression), classification (e.g., binary classifiers, multiclass classifiers, semantic segmentation models, instance-based segmentation models, etc.), segmentation algorithms (e.g., neural networks, such as CNN based algorithms, thresholding algorithms, clustering algorithms, etc.), rules, heuristics (e.g., inferring the number of stories of a property based on the height of a property), instance-based methods (e.g., nearest neighbor), regularization methods (e.g., ridge regression), decision trees, Bayesian methods (e.g., Naïve Bayes, Markov, etc.), kernel methods, statistical methods (e.g., probability), deterministics, support vectors, genetic programs, isolation forests, robust random cut forest, clustering, selection and/or retrieval (e.g., from a database and/or library), comparison models (e.g., vector comparison, image comparison, etc.), object detectors (e.g., CNN based algorithms, such as Region-CNN, fast RCNN, faster R-CNN, YOLO, SSD-Single Shot MultiBox Detector, R-FCN, etc.; feed forward networks, transformer networks, generative algorithms (e.g., diffusion models, GANs, etc.), and/or other neural network algorithms), key point extraction, SIFT, any computer vision and/or machine learning method (e.g., CV/ML extraction methods), and/or any other suitable model or methodology.

The models can be trained using: self-supervised learning, semi-supervised learning, supervised learning, unsupervised learning, reinforcement learning, transfer learning, Bayesian optimization, positive-unlabeled learning, using backpropagation methods, and/or otherwise learned. The model can be learned or trained on: labeled data (e.g., data labeled with the target label), unlabeled data, positive training sets (e.g., a set of data with true positive labels, negative training sets (e.g., a set of data with true negative labels), and/or any other suitable set of data.

The scoring model functions to determine an objective score for a subject (e.g., property). The scoring model is preferably a machine learning model, such as a neural network (e.g., CNN, RNN, etc.) or a classical model, but can alternatively be any other suitable model. The system can include one or more models. The scoring model can be specific to a subject, a subject class (e.g., house, physical structure, etc.), a subject subclass (e.g., single-family house, multi-family house, etc.), a subjective characteristic (e.g., appeal, attractiveness), a location (e.g., by street, by town, by city, by county, by state, by country, by ZIP code, etc.), a location type (e.g., suburban neighborhood, urban neighborhood, rural neighborhood, etc.), a perspective (e.g., exterior, interior, front view, back view, etc.), a measurement quality (e.g., resolution, pixel density, etc.), a metadata value (e.g., a information modality, a provider, a perspective, etc.), rating method, an end user (e.g., customer; wherein the scoring model can be tuned using labels received from the end user), and/or be otherwise specific. Additionally, and/or alternatively, the model can be generic across subjects, subject classes, subject subclasses, subjective characteristics, locations, location types, metadata values, and/or be otherwise generic.

The scoring model can determine (e.g., predict, infer, calculate, look up, etc.) an objective score for a subject based on the subject's information (e.g., measurements, parameters, etc.). The scoring model preferably determines the objective score based on measurements of the subject (e.g., images, videos, depth information, etc.), but can additionally or alternatively determine the objective score based on subject attribute values (e.g., property attributes), subject descriptions, and/or other information.

The scoring model is preferably generated (e.g., trained) using the labels (e.g., ranking data) for different subject sets, but can be generated using other information. In a first variant, the scoring model is trained to predict a rating for each of a set of training subjects (e.g., training properties), wherein the rating for each training subject is determined based on a label associated with a subject comparison group that includes the training subject. In a second variant, the training subject population is discretized into bins, clusters, or categorical variable values based on the respective ratings, wherein the model is trained to predict the rating. In a third variant, the model is trained to predict an objective score for a training subject, and can be trained on a comparison between a predicted label (determined by comparing the objective score for the training subjects within a subject comparison group) and the actual label. In a fourth variant, the model can be trained to predict the label (e.g., rating).

The rating model functions to determine a rating for each subject based on the associated labels (e.g., rank). The system can include one or more rating models. The rating model can predict the rating, calculate the rating (e.g., using a rating algorithm), and/or otherwise determine the rating. Examples of rating algorithms that can be used include: the Elo rating algorithm, Gliko rating algorithm, Harkness rating algorithm, and/or any other suitable rating algorithm.

The discretization model functions to segment the subject population into discrete groups. The discretization model can be used to generate the training targets for the scoring model, to discretize the outputs of the scoring model, and/or otherwise used. The discretization model can discretize the training subjects by rank, by rating, and/or otherwise discretize the subject population. The system can include one or more discretization models (e.g., for different customers, for training data generation vs. runtime, etc.). When used in both training and runtime, the discretization model used during training is preferably the same as that used during runtime, but can alternatively be different (e.g., the runtime model can be specific to an end user or customer). The discretization model can be a binning model, clustering model, classification model (e.g., categorization model), and/or any other model. The discretization model can use: rules (e.g., ratings 100-500 are in bin 1, 500-3000 are in bin 2, etc.); similarity scores (e.g., rating differences, cosine scores, etc.), statistical binning (e.g., to bin in one or more dimensions; k-means clustering, quantile assignment, etc.), pattern recognition, and/or any other suitable methodology.

The method is preferably performed by a computing system (e.g., platform), but can additionally and/or alternatively be performed by any other suitable system.

The computing system can include a remote computing system (e.g. one or more servers or processing systems); a local system, such as a user device (e.g., smartphone, laptop, desktop, etc.); a distributed system; a datastore; a user interface; and/or another computing system. External systems (e.g., user devices, third party systems, etc.) can interact with the computing system using: an application programming interface (e.g., an API), via a set of requests, via a graphical user interface, via a set of webhooks or events, and/or via any other suitable computing interface.

However, the system can include any other additional or alternative suitable components.

4.1. Determining a Subject Comparison Group S100.

Determining a subject comparison group S100 functions to determine a subject comparison group (e.g., a group of properties) for training. S100 can be repeated one or more times to obtain one subject comparison group, multiple subject comparison groups, a predetermined number of subject comparison groups, all possible unique subject comparison groups (e.g., for a given subject set), and/or any other suitable number of subject comparison groups. The one or more subject comparison groups are preferably determined from a training subject set, but can additionally and/or alternatively not be determined from a training subject set. The training subject set can be limited by one or more subject attribute values (e.g., only include single family homes, only include subjects from a single neighborhood), be limited to subjects for which labels have been or can be determined, be otherwise limited, or can be unlimited. Multiple subject comparison groups can be determined from a subject set using sampling techniques with replacement (e.g., wherein the subject is replaced into the subject set after sampling; wherein a single subject can be assigned to multiple subject comparison groups), or without replacement (e.g., wherein the subject is not replaced into the subject set after sampling; wherein a single subject is assigned to a single subject comparison group).

In a first variant, each subject comparison group has a size S, and subject comparison groups are determined by creating every unique combination of S subjects within a subject set (e.g., subject pairs are determined based on exhaustive pairing between all subjects within the set).

In a second variant, the subjects for a subject comparison group are randomly selected from a set of subjects (e.g., with replacement, without replacement, etc.).

In a third variant, unique subject comparison groups are created from the subject set. For example, subject comparison groups are created from a set of subjects using a search method (e.g., binary search, Gaussian search, etc.).

In a fourth variant, a subject comparison group is manually specified (e.g., comparisons for a real estate appraisal).

In a fifth variant, subject comparison groups are determined to limit the number of groups needed to train a model that predicts subjects' objective scores. In a first example, an initial subset of subject comparison groups are determined (e.g., randomly, according to a heuristic, etc.) and sorted into pools, wherein the remainder of subject comparison groups are determined based on the outcomes of the pools. In a second example, comparison groups are determined using active learning to select comparison groups.

In a sixth variant, subject comparison groups are determined based on subject attribute values and/or other subject information. In a first example, subject comparison groups are determined such that subjects share one or more subject attribute values (e.g., same number of beds and baths, same property class, are comparable, etc.). In a second example, subject comparison groups are determined such that there is variety in subject attribute values within a group and/or across groups.

In a seventh variant, subject comparison groups are determined based on the output of S300 (e.g., to minimize the total number of pairs).

Optionally, only a subset of the subject comparison groups determined by any of the variants described can be used for further portions of the method.

However, a subject comparison group can be otherwise determined.

4.2. Determining Subject Information for the Subject Comparison Group S200.

Determining subject information for the subject comparison group S200 functions to determine a set of subject information (e.g., a measurement set) for each subject of the subject comparison group. In variants, the subject information set can be used to determine a label for the subject comparison group in S300, as input to the model in S400 (e.g., used as training data), and/or otherwise used.

The subject information for each subject of the subject comparison group preferably shares one or more measurement parameter values (e.g., associated with the measurement context), but can additionally and/or alternatively not share any measurement parameter values. In a first example, subject information can include imagery of properties, and all images can be taken from the same pose relative to each property of interest (e.g., street view image, aerial image, etc.). Subject information can be retrieved from a database, retrieved from a real estate listing service (e.g., MLS™, Redfin™, etc.), and/or otherwise determined.

Each subject information set (e.g., measurement set) for a subject preferably includes one or more measurements of the subject, but can additionally and/or alternatively include measurement parameter values, subject attribute values, and/or any other suitable attribute. In a first example, measurements for the subject comparison group include an image for each subject. In a second example, measurements for the subject comparison group include multiple measurements (e.g., image, video, audio, digital surface model, etc.) for each subject. In a third example, each measurement set includes subject attribute values (e.g., square footage, number of beds and baths, etc.), front elevation views, and location information for each subject. In a fourth example, subject information for the subject comparison group can include a combination of measurements and attributes. In a fifth example, subject information for the subject comparison group can include a combination of measurements and measurement parameter values (e.g., scene class, perspective relative to the subject, pose relative to the subject, modality, season, measurement quality, measurement date, measurement time, measurement location, etc.).

S200 can be repeated for one or more subject comparison groups (e.g., determined in S100) and/or otherwise repeated.

The type of subject information determined in S200 and used by S300 can be the same as the type of subject information determined in S500, or alternatively can be different. In a first example, the method can include determining neighborhood accessibility scores S200, determining a relative ranking of neighborhoods based on accessibility scores S300, and training the model to predict which neighborhood is better based on curbside imagery using the accessibility-score-based neighborhood ranking as the training target S400, wherein the test measurement of S500 includes curbside imagery.

However, measurements for the subject comparison group can be otherwise determined.

4.3. Determining a Label for the Subject Comparison Group S300.

Determining a label for the subject comparison group S300 can function to determine a ground-truth label (e.g., comparative label, subjective label, etc.) specifying the subjective comparison between measurements of the measurement sets of the subject comparison group (e.g., which house is more appealing, which scene is gloomier, which neighborhood is better, which roof looks older, which garden is more relaxing, which interior is more attractive, which viewshed is more appealing, which roof is in better condition, etc.). S300 can be repeated for one or more subject comparison groups (e.g., determined in S100) and/or otherwise repeated.

One label for each subject comparison group (e.g., subject 1 wins) is preferably determined, but additionally and/or alternatively one label for each subject of the subject comparison group (e.g., subject 1 preferred and subject 2 not preferred, subject B wins and subjects A and C lose, an ordered ranking for 3 or more subjects, etc.) can be determined, and/or multiple labels for each subject comparison group can be determined (e.g., wherein an aggregate label is determined from the multiple labels). Each label is preferably binary (e.g., wins and loses, 0 and 1, etc.), but can alternatively be non-binary (e.g., multi-subject ranking). Each label can be a numerical label (e.g., 0, 1, etc.), a categorical label (e.g., wins, loses, ties, more appealing, less appealing, better, much better, etc.), and/or any other suitable label type. Each label preferably is represented as a pairwise comparison or a groupwise comparison, but can additionally and/or alternatively represent a score.

Preferably each label is determined based on a measurement (e.g., image) of the subject, but additionally or alternatively can be determined based on any other subject information. Each label can be determined based on all pieces of information in each subject's information set, one piece of information from each subject's information set, multiple pieces of information from each subject's information set, and/or any other set of subject information. Each label determined using a subset of subject information (e.g., one measurement, multiple measurements, etc.) is preferably inherited by the remainder of the subject information set, but can alternatively not be inherited by the remainder of the subject information set. For example, when a measurement set includes a digital surface model and an image and the label is determined based on the image (e.g., subset of the measurement set), the digital surface model also inherits the determined label.

Preferably labels are manually determined, but alternatively can be automatically determined (e.g., based on sale price, heuristics, etc.). Each label can be determined by a human vote (e.g., wherein a human manually ranks at least one subject of a subject comparison group), by an average of human votes, by a model and/or algorithm, and/or otherwise determined. In a first variant, each label is manually determined. In this variant, a human labeler is presented with subject information (e.g., measurements) for each of the subjects in a subject comparison group. The human labeler is prompted to select their preferred subject and/or order their subject preferences based on the presented measurements (e.g., example shown in FIG. 5, by clicking the measurement, by typing an input, by clicking a display associated with their preferred subject, etc.). The selected label is received from the user. For example, a human labeler can be presented with a first measurement of a first subject (e.g., of an abandoned house with damaged roof and dull exterior) and a second measurement of a second subject (e.g., of a newly renovated home with freshly painted bright exterior). In a first specific example, the human labeler labels the subjective comparison between the subject pair and/or measurement pair as "subject 2 wins" and/or "second measurement wins." In a second specific example, the human labeler labels the subjective characteristic of the subject in the first measurement as "loses" and the subjective characteristic of the subject in the second measurement as "wins." In a third specific example, the human labeler clicks a specific area of a screen associated with their preferred subject to label that subject as the winner. Labels for one or more subject comparison groups can be received from the same human labeler and/or from multiple human labelers.

In a second variant, the label for subject comparison group can be one or more ratings for individual subjects. The label for a subject can be calculated based on the results of one or more comparisons involving the subject (e.g., using the ELO rating formula).

In a third variant, the label for a subject comparison group is automatically determined by a trained comparison model (e.g., classifier, neural network, etc.). In this variant, the comparison model can determine a label for the subject pair based on the respective measurement sets. For example, S300 can include: extracting representations for the first and second subjects (e.g., vectors) from the respective measurement sets (e.g., from the respective images) using a representation model (e.g., encoder, neural network, etc.); and predicting a label based on the first and second representations using the comparison model (example shown in FIG. 5). In a second example, the comparison model can predict the label based on subject attribute values (e.g., property price, viewshed, etc.) in addition to the representation. However, the comparison model can determine the label in any other manner.

The comparison model can be trained on manual labels (e.g., determined using the first variation) and/or other preference signals (e.g., relative number of views, clicks, or dwell time on a real estate listing site). For example, the comparison model can predict an estimated label based on the measurement sets or representations thereof for an already-labeled subject pair, and be trained based on a comparison between the actual label and the estimated label for said subject pair. However, the comparison model can be otherwise trained. When the comparison model is trained using manually labeled subject pairs, the manually labeled subject pairs are preferably selected from the same subject set as that labeled by the comparison model, but can alternatively be selected from a different set. In this embodiment, only a subset of all subject pairs are manually labeled, wherein the comparison model labels the remainder of the subject pairs. However, the comparison model can be used to label any proportion of subject pairs.

However, a label for the subject pair can be otherwise determined.

4.4. Training a Model Based on the Label S400.

Training a model based on the label S400 functions to train a model that can determine an objective score for a subjective characteristic of a subject. The model can be trained once, periodically (e.g., daily, weekly, monthly, yearly, etc.), at random times, when new subject data is available, and/or any other suitable time frequency. In variants, S400 can include determining ratings for the subjects. The model can determine the objective score based on: measurements of the subject (e.g., elevation views, perspective views, aerial views, etc.), subject attribute values (e.g., neighborhood, square footage, number of beds/baths, etc.), measurement parameter values, and/or any other subject information. Model inputs can be information relevant to one or more subjects.

The subject information type used as input for the model can be the same or different from the subject information type used in S300. In a first example, the model can be trained on images taken from the same pose and/or perspective relative to a building as a set of images shown to human labelers to determine subject comparison group labels in S300. In a second example, attribute values can be used to determine the label in S300, and images can be used as input for model training S400.

One or more models can be trained. For example, different models can be trained for different measurement perspectives (e.g., interior, exterior, curbside, top-down, etc.), different subject types, different geographic regions, different subjective characteristics, different subject information types, and/or other subject parameters. Alternatively, a single model can be trained.

The model can output a score (e.g., a rating) for a subject, a classification of which subject wins, a relative ranking within the subject comparison group, which subject will be preferred (e.g., given the measurements for both subjects), and/or any other suitable output (e.g., label). In use, the trained model can predict a score for a subject, given a subject information, such as a measurement of the subject, descriptions of the subject, and/or other information. The model can predict, infer, calculate, select, and/or otherwise determine the output. In variants where a label (e.g., rating) is calculated (e.g., in S300), the rating can optionally be normalized to a predetermined scale (e.g., a scale of 1-10), or remain unnormalized. In these variants, the model can be trained to predict the normalized score or be trained to predict the unnormalized score (e.g., wherein the score can be subsequently normalized before presentation to the user).

Figure 3:
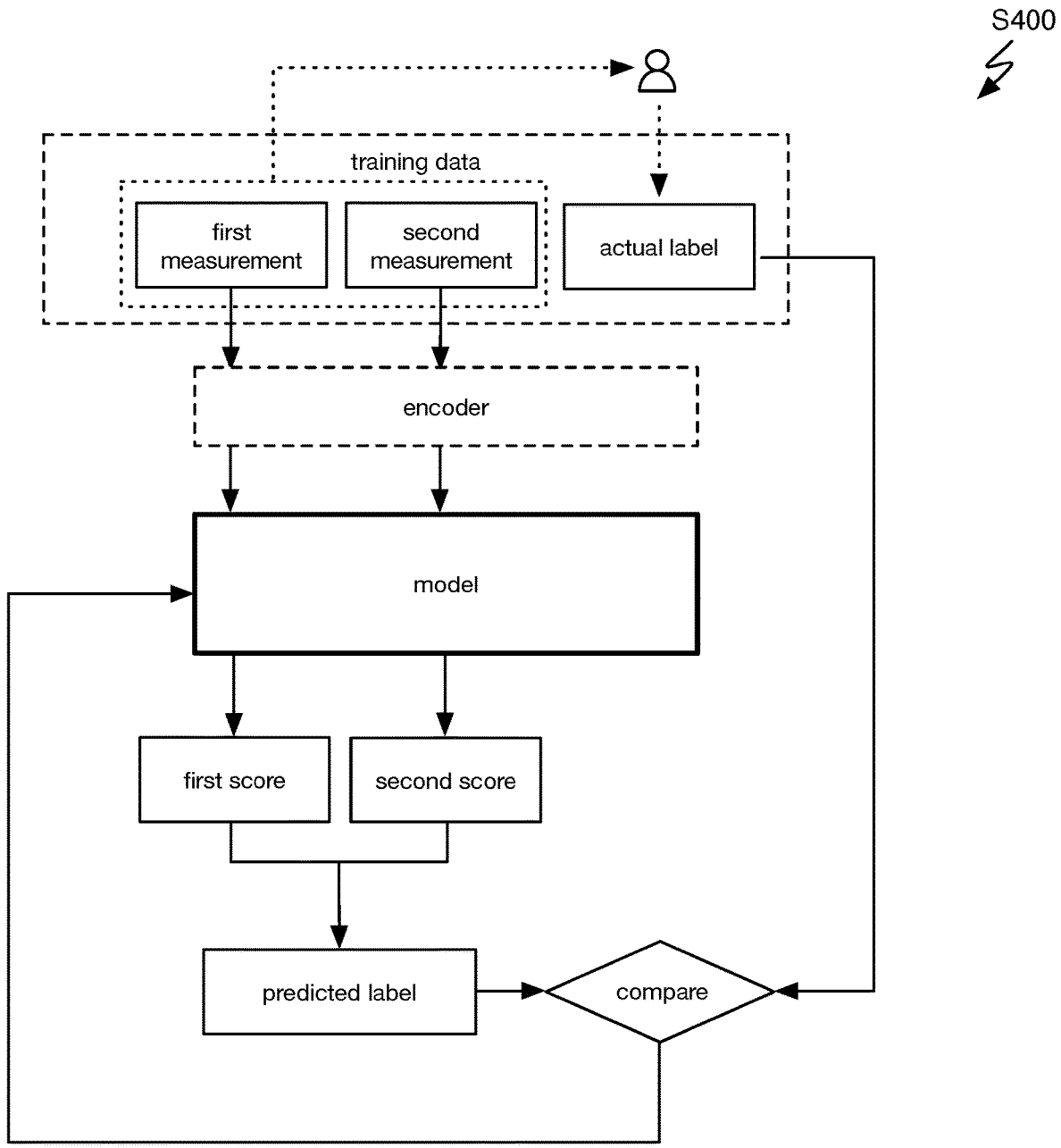
FIG. 3 is a schematic representation of a variant of the method.

In a first variant, S400 can include determining a first and second score using a model (e.g., deep learning regression model) based on a first and second measurement, respectively, of the subject pair, determining a predicted label for the measurement pair based on the comparison (e.g., determining which subject is preferred based on the respective score), and training the model based on a comparison between the predicted label and the actual label (e.g., ground-truth label manually determined previously in S300); example shown in FIG. 3. The predicted label can be calculated based on the first and second score using a ranking system (e.g., Elo rating system, Harkness system, Glicko rating system, etc.), by a direct comparison of the scores, by calculating the probability of winning based on the scores, and/or otherwise determined. In an illustrative example, S400 can include extracting a first and second vector using an encoder based on a first and second measurement, respectively, of a first and second subject from a comparison group; predicting scores (ratings) for each subject using a model; determining a predicted label (e.g., which subject wins/loses/is preferred/etc.) based on the predicted scores; and training the model based on a comparison between the predicted label and the actual label for the comparison group.

Figure 4:
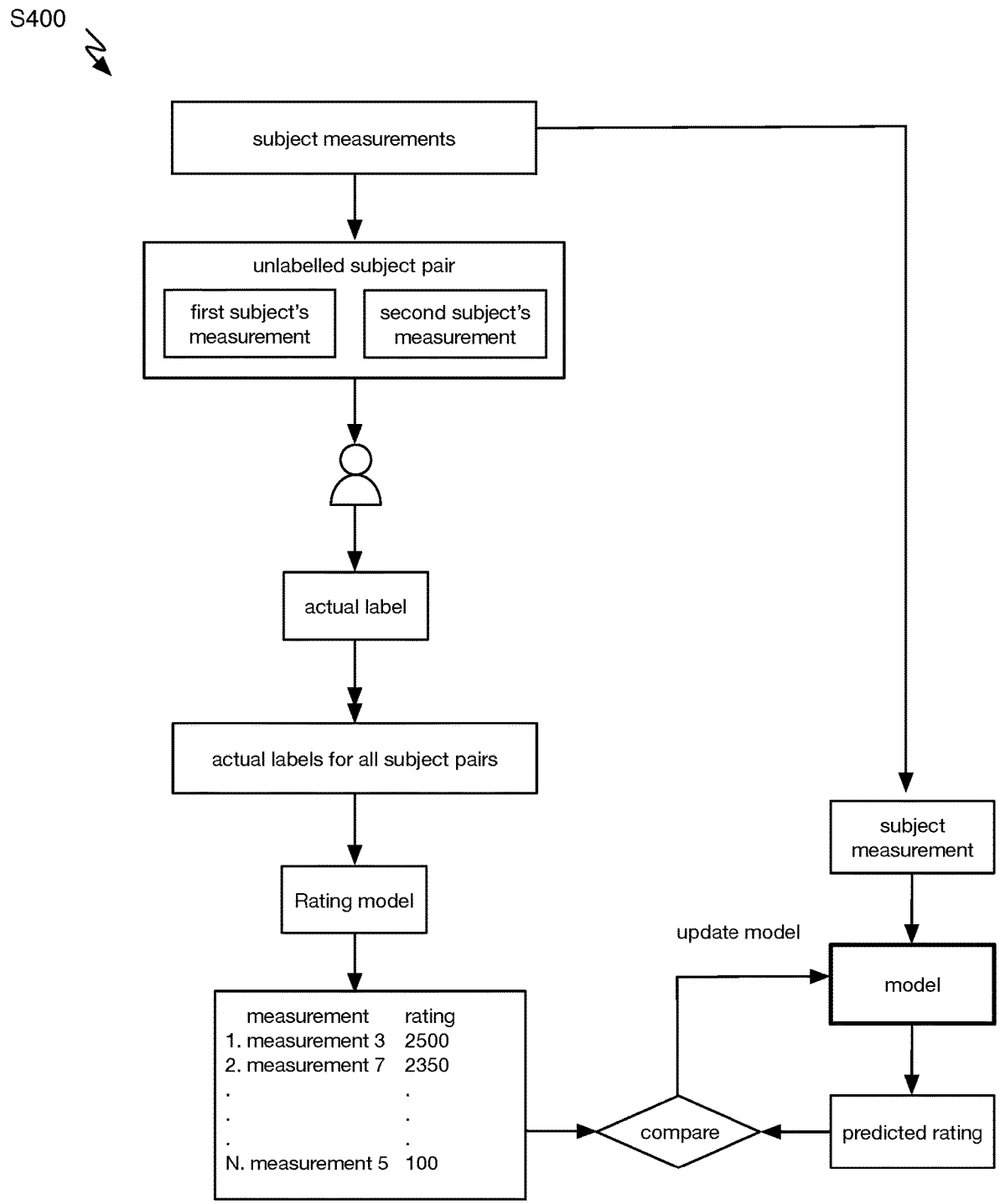
FIG. 4 is an illustrative example of a variant of the method.
Figure 5:
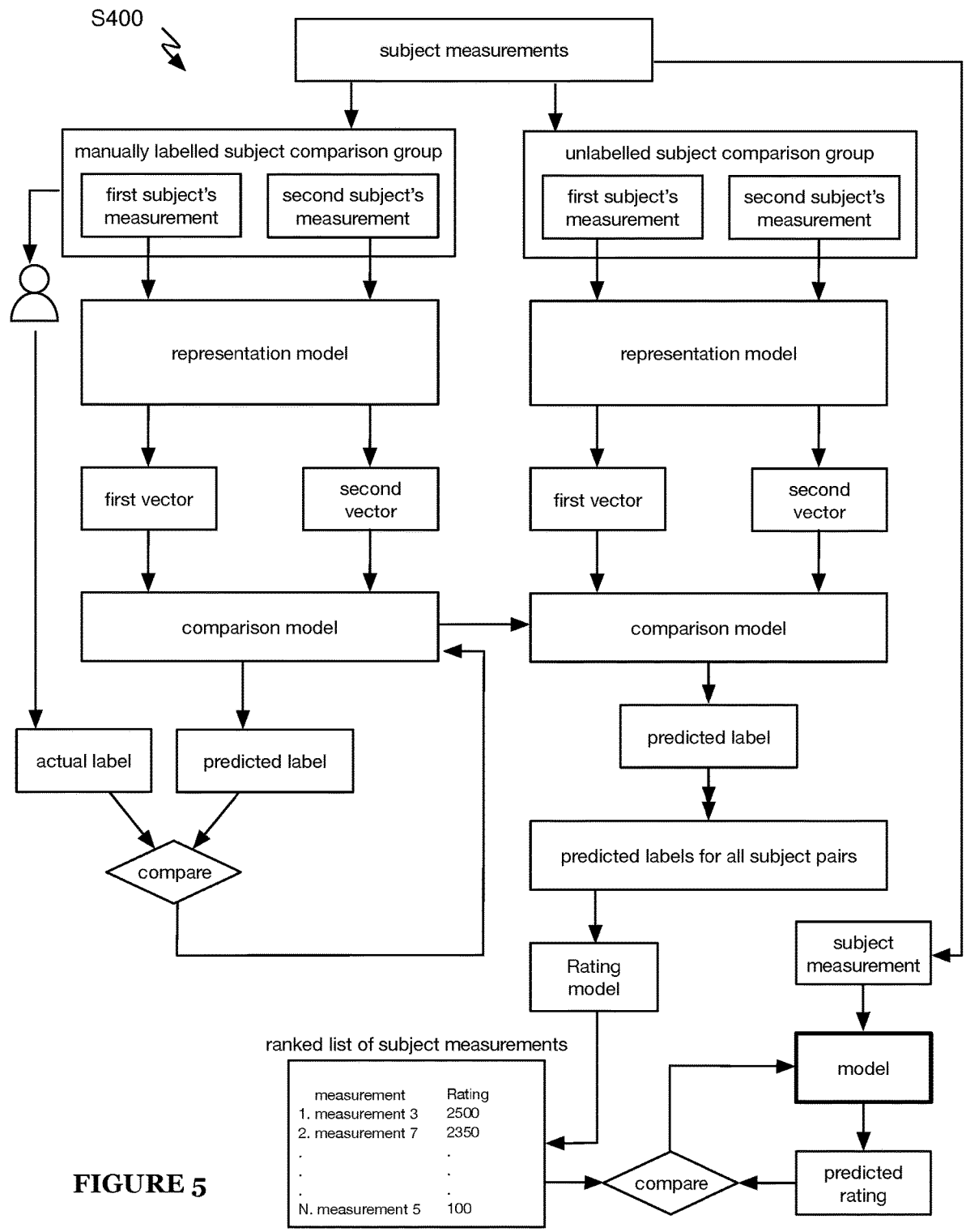
FIG. 5 is an illustrative example of a second variant of the method.

In a second variant, S400 can include calculating a score for each subject of the subject set based on the labels for each subject pair, and training the model to predict the subject's score based on the subject's measurement set (e.g., the same or different measurement set as that used to predict the label); examples shown in FIG. 4 and FIG. 5. The score can be a rating, rank, and/or other objective measure. The score can be calculated using a scoring model leveraging: the Elo rating system, the Harkness rating system, the Glicko rating system, ranking the subjects in a ranked list based on the labels (e.g., win/lose labels), and/or any other rating or scoring method.

In a third variant (e.g., a binning variant), S400 can include: using a first model (e.g., the trained model of the first or second variant) to output the scores for a plurality of subject measurements; determining a distribution of the scores; binning subsets of the distribution into bins (e.g., 1-10, quantiles, etc.) and/or otherwise normalizing the data; and training a second model to predict the bin for a subject measurement.

However, the model can be otherwise trained.

In a first illustrative example, generating a trained model includes: determining subject pairs from a subject set; determining labels (e.g., win/loss labels) for each subject pair; optionally determining a ranked list of subjects based on the manual labels (e.g., based on which subject within the pair was preferred); calculating a score (e.g., rating) for each subject based on the ranked list and/or manual labels using a scoring model; and training a model to predict the score for each subject; example shown in FIG. 4. The labels for each subject pair can be determined manually, using a second model (e.g., trained to predict which subject would win/lose based on the subject measurements), and/or otherwise determined.

In a second illustrative example, generating a trained model includes: determining subject pairs from a subject set; determining manual labels (e.g., win/loss labels) for a subset of the subject pairs; training a comparison model to predict the label (e.g., win/loss label or which subject wins) based on the manual labels and measurements for the subject pair subset; labeling the remainder of the subject pairs using the comparison model; optionally generating a ranked list based on the labels; calculating a score (e.g., rating) for each subject based on the ranked list using a scoring model; and training a model to predict the score for each subject; example shown in FIG. 5.

In a third illustrative example, generating a trained model includes: training the model to predict a first and second score based on the first and second measurement, respectively; predicting the label (e.g., which subject would win) based on the respective scores; and comparing the predicted label to an actual label (e.g., determined manually or automatically) for the subject pair; example shown in FIG. 3. In examples, the model can predict the first and second score based on a first and second vector extracted from the first and second measurement, respectively (e.g., using an encoder); however, the model can otherwise predict the first and second scores.

In a fourth illustrative example, generating a trained model can include: determining a rating for each subject (e.g., based on manually-determined rankings between subjects, based on the subjects' respective measurements; using the first illustrative example); discretizing the subjects into discrete values (e.g., bins or clusters) based on their ratings; and training a model to predict a subject's discrete value given the subject's measurements. Alternatively, the model can be trained to predict the subject's rating, wherein the rating is then discretized.

However, the model can be otherwise trained.

4.5. Generating Synthetic Training Data S425.

The method can optionally include generating synthetic training data based on the labels S425, which can function to increase the amount of data (e.g., to a statistically significant amount of training data, training data for subjects where the information used to determine the label in S300 doesn't exist, etc.) available for training the model. S425 can be performed using the trained model of S400, and/or otherwise performed. S425 can be performed after S400, before S400, and/or at any other time. In an example, S425 can be performed for the binning variant to generate enough scored subjects to determine a statistically significant distribution.

Synthetic training data can include a label for a subject and the type of subject information used to determine the label, and/or other information. Generating synthetic training data can use GAN, bootstrap, generative models, diffusion models, agent based modeling (ABM), and/or other algorithms and/or techniques.

4.6. Determining a Test Subject S450.

Determining a test subject S450 functions to determine a subject to be analyzed (e.g., property to be analyzed, property of interest, etc.). The subject is preferably determined from a request received from a user (e.g., via an interface, an API, etc.), but can alternatively be determined from a geographic region of interest, be depicted within a measurement (e.g., a wide-scale image), be automatically selected (e.g., randomly selected, selected based on a set of filters provided by a user, etc.), and/or otherwise determined. The subject can be received as a standalone subject, received as part of a set of subjects, and/or otherwise received. The set of subjects can be determined from: a list of subjects, subjects within a geographic region, subjects (e.g., properties) currently on the market, subjects satisfying a set of conditions, subjects depicted within an image, subjects in a list, and/or otherwise determined. Each subject within the set can be identified by its: address, geolocation, parcel number, lot number, block number, unique ID, and/or any other subject identifier.

However, the subject can be otherwise determined.

The method can additionally or alternatively include selecting a model, which functions to determine how the subject score will be determined. The model can be selected based on the subject's parameters (e.g., building type, etc.), the subject's available information (e.g., whether images are available, whether descriptions are available, etc.), based on the subject's subjective characteristics to score (e.g., specified by a user, by an API request, etc.), and/or otherwise selected.

4.7. Determining Test Information for the Test Subject S500.

Determining test information for the test subject S500 functions to determine information representative of the subject to be evaluated for its subject characteristic. The test information preferably includes a test measurement, but can additionally or alternatively include subject attributes (e.g., roof condition, yard condition, roof area, etc.), subject descriptions, and/or other information. The test measurement can be one test measurement, multiple test measurements, and/or any other suitable set of test measurements. The test information can have substantially the same information parameters (e.g., type, quality, perspective, etc.) and/or different information parameters as those used to train the model in S400. The test information can have substantially the same information parameters and/or different information parameters as those used to determine labels in S300. The test information can be retrieved from a database, retrieved from a real estate listing service (e.g., MLS™, Redfin™, etc.), received as part of a request, and/or otherwise determined.

However, test information for a subject can be otherwise determined.

4.8. Determining a Score for the Test Subject S600.

Determining a score for the test subject S600 functions to determine an objective score of the subjective characteristic of a subject from a test measurement. The score is preferably a numerical score (e.g., 100, 500, 2500, etc.), but can alternatively be a categorical score (e.g., very unappealing, unappealing, neither unappealing nor appealing, appealing, very appealing, etc.). The score is preferably determined based on the test information determined in S500, but can be determined using any other suitable information.

Figure 9:
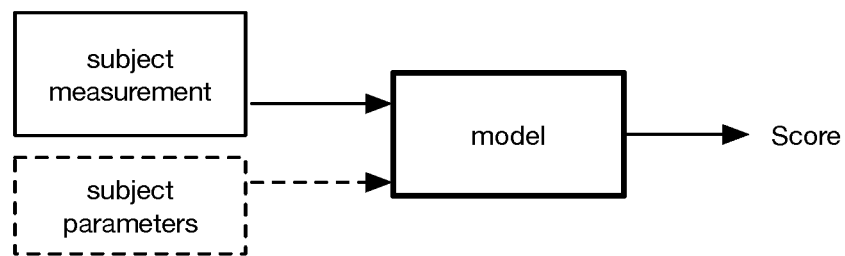
FIG. 9 is a schematic representation of determining a subject's score using the trained model.

In a first variant, a score for the test subject can be determined by inputting the test information (e.g., a set of test measurements) into the trained model, trained in S400 (e.g., example shown in FIG. 9). The score can optionally be normalized to a predetermined scale (e.g., a scale of 1-10).

In a second variant, a score can be determined using the second or third illustrative examples of S400, where the test subject is paired with another measurement from the set. In an illustrative example, the model can predict how the test subject would rank relative to another subject within a subject set based on the subjects' information. The resultant ranking can then be used as the score, be used to determine a rating, or be otherwise used.

However, the score can be otherwise calculated.

Figure 11:
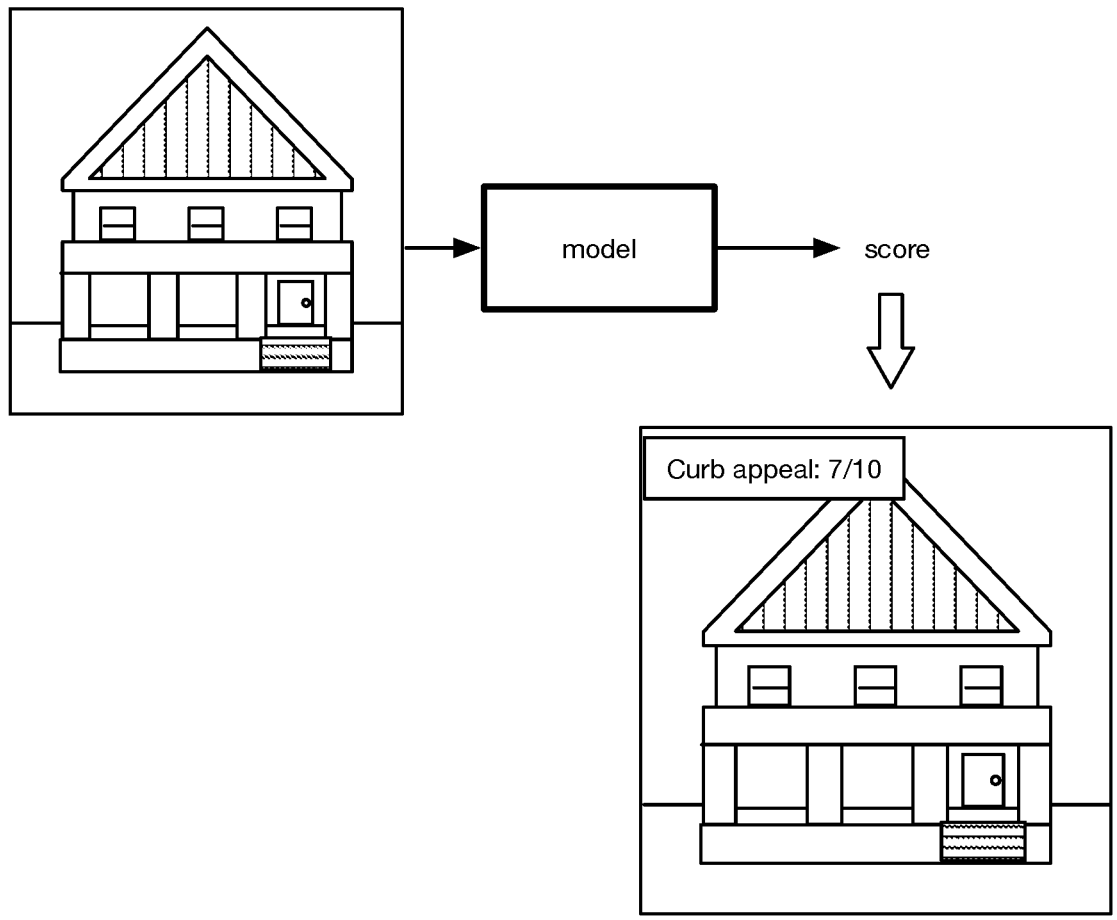
FIG. 11 is an illustrative example of determining a score for a subject and presenting said score.

S600 can additionally include providing the score to an endpoint through an interface. The endpoint can be: an endpoint on a network, a customer endpoint, a user endpoint, an automated valuation model system, a real estate listing service (e.g., Redfin™, MLS™, etc.), an insurance system, and/or any other suitable endpoint. The interface can be: a mobile application, a web application, a desktop application, an API, a database, and/or any other suitable interface executing on a user device, gateway, and/or any other computing system. For example, a real estate listing service can display the score (or a normalized version of the score) alongside the listing for the subject; example shown in FIG. 11.

However, a score for the test subject can be otherwise determined or used.

5. USE CASES

The method can optionally include using the score for downstream assessments, which can function to determine one or more values based on the output of the trained model. The scores can be used with: real estate property investing (e.g., provide a curb appeal score; provide an interior appeal score; identify underpriced properties that can increase in value through renovation and/or repairs; etc.); identify gentrification of a neighborhood (e.g., average score is increasing for a neighborhood over time); incorporate the score into a valuation model (e.g., to establish the property price; to correct for valuation errors; etc.); identify properties in portfolio that have suffered damage (e.g., score decreases above a certain threshold); identify properties in a portfolio that need to be reassessed (e.g., score changed above a threshold); identify remodeling options (e.g., based on what is trending/popular/preferred at the time; based on other remodeled properties' scores; based on a comparison between the scores of property remodeling options; etc.); real estate valuations (e.g., use score as an input to an automated valuation model; use score to detect error in property evaluation models; use score as a supplement to a property-level valuation report; etc.); real estate and loan trading (e.g., identify deterioration since prior due diligence was completed; determining liquidity scores and/or timelines; incorporate score into collateral valuation in mortgage origination and in secondary mortgage market; etc.); insurance underwriting (e.g., determine pricing of insurance depending on the score; optimize inspection to identify where to send inspectors; determine when to reach out to adjust insurance policy, such as when the score changes above a certain threshold; identify which properties to initiate claims for; etc.); roof condition rating (e.g., wherein the subjective characteristic is roof condition); and/or otherwise used. In an illustrative example, a proposed property modification (e.g., remodeling) can be evaluated by generating measurements of the modified property (e.g., synthetic measurements, in-silico measurements, etc.), scoring the modified property based on the generated measurements using the trained model, comparing the score to other proposed modification options (and/or the original property), and optionally selecting the modification with the most desirable (e.g., highest) score.

However, the score can be otherwise used.

The method can optionally include determining interpretability and/or explainability of the trained model and/or the resultant score, wherein the identified attributes (and/or values thereof) can be provided to a user, used to identify errors in the data, used to identify ways of improving the model, and/or otherwise used. The method can include determining the contribution of at least one attribute of a subject (e.g., property) captured in the subject information (e.g., measurements) to the objective score. In a first specific example, the method can be used to determine a set of factors that affect the objective score (e.g., curb appeal). In a second specific example, the method can be used to determine an effect of seasonality on property valuation. Interpretability and/or explainability methods can include: local interpretable model-agnostic explanations (LIME), Shapley Additive explanations (SHAP), Ancors, DeepLift, Layer-Wise Relevance Propagation, contrastive explanations method (CEM), counterfactual explanation, Protodash, Permutation importance (PIMP), L2X, partial dependence plots (PDPs), individual conditional expectation (ICE) plots, accumulated local effect (ALE) plots, Local Interpretable Visual Explanations (LIVE), breakDown, ProfWeight, Supersparse Linear Integer Models (SLIM), generalized additive models with pairwise interactions (GA2Ms), Boolean Rule Column Generation, Generalized Linear Rule Models, Teaching Explanations for Decisions (TED), and/or any other suitable method and/or approach.

All or a portion of the models discussed above can be debiased (e.g., to protect disadvantaged demographic segments against social bias, to ensure fair allocation of resources, etc.), such as by adjusting the training data, adjusting the model itself, adjusting the training methods, and/or otherwise debiased. Methods used to debias the training data and/or model can include: disparate impact testing, data pre-processing techniques (e.g., suppression, massaging the dataset, apply different weights to instances of the dataset), adversarial debiasing, Reject Option based Classification (ROC), Discrimination-Aware Ensemble (DAE), temporal modeling, continuous measurement, converging to an optimal fair allocation, feedback loops, strategic manipulation, regulating conditional probability distribution of disadvantaged sensitive attribute values, decreasing the probability of the favored sensitive attribute values, training a different model for every sensitive attribute value, and/or any other suitable method and/or approach.

Different processes and/or elements discussed above can be performed and controlled by the same or different entities. In the latter variants, different entities can communicate via: APIs (e.g., using API requests and responses, API keys, etc.), requests, and/or other communication channels.

As used herein, "substantially" or other words of approximation can be within a predetermined error threshold or tolerance (e.g., within 0.1%, 1%, etc.) of a metric, component, or other reference, and/or be otherwise interpreted.

Alternative embodiments implement the above methods in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method comprising:
    determining a property;
    determining property information for the property; and
    determining an objective metric for a subjective characteristic of the property based on the property information using a model trained on a set of training properties associated with a set of qualitative labels for the subjective characteristic, wherein the set of training properties are ranked based on the subjective characteristic using the set of qualitative labels, and wherein the model is tuned using a qualitative label.

2. The method of claim 1, wherein the model comprises a transformer model.

3. The method of claim 1, wherein a qualitative label of the set of qualitative labels is manually determined by:
    determining a training property pair from the set of training properties;
    presenting a set of measurements of the training property pair to a user; and
    wherein ranking the set of training properties comprises receiving the subjective characteristic comprising a user preference between the training property pair, wherein the user preference is determined as the qualitative label for the training property pair.

4. The method of claim 1, further comprising determining a set of attributes for the property based on the property information, wherein the model determines the objective metric based on the set of attributes.

5. The method of claim 1, wherein the property information comprises at least one of a set of measurements, a set of descriptions, permit data, insurance loss data, inspection data, or appraisal data.

6. The method of claim 1, wherein the property information for the property is an input to the model, wherein the property information for the respective training property comprises a set of images and text.

7. The method of claim 1, wherein the model is trained to predict an objective metric indicative of a ranking, determined based on the set of qualitative labels, for each of the set of training properties.

8. The method of claim 1, wherein the model is trained by:
determining a relative ranking for each training property of the set of training properties based on the set of qualitative labels;
determining an objective metric for each training property based on the respective relative ranking; and
training the model to predict the objective metric, based on property information for the respective training property.

9. A system, comprising:
a processing system configured to:
determine a set of properties;
determine property information for each property of the set of properties; and
determine an appeal score for each property of the set of properties based on the respective property information using a model trained on a set of training properties ranked by subjective appeal using a set of qualitative labels.

10. The system of claim 9, wherein the model comprises a transformer model.

11. The system of claim 9, wherein a qualitative label of the set of qualitative labels is automatically determined using a comparison model.

12. The system of claim 11, wherein the comparison model comprises a transformer model.

13. The system of claim 9, wherein the qualitative label is further determined by:
determining a training property pair from the set of training properties;
determining measurements of the training property pair;
extracting representations for the training property pair from the measurements using an encoder; and
determining the qualitative label based on the representations using a comparison model.

14. The system of claim 9, wherein the appeal score is an absolute score, wherein the model is trained to predict the absolute score based on relative rankings.

15. The system of claim 9, wherein inputs to the model comprises multiple input modalities.

16. The system of claim 9, wherein the processing system is further configured to determine explainability of the model for the appeal score.

17. The system of claim 16, wherein determining the explainability of the model for the appeal score comprises determining a contribution of a set of attributes of the property to the appeal score.

18. The system of claim 9, wherein the appeal score is an input to a downstream model.

19. A method comprising:
determining a property;
determining property information for the property; and
determining an objective metric for a subjective characteristic of the property based on the property information using a model trained on a set of training properties associated with a set of qualitative labels for the subjective characteristic, wherein the set of training properties are ranked based on the subjective characteristic using the set of qualitative labels.

* * * * *